US012779667B2

(12) United States Patent
Sameoto et al.

(10) Patent No.: US 12,779,667 B2
(45) Date of Patent: Nov. 3, 2026

(54) COMPOSITE ACTUATOR

(71) Applicant: President and Fellows of Harvard College, Cambridge, MA (US)

(72) Inventors: Dan Sameoto, Edmonton (CA); Amit Nagarkar, Boston, MA (US); Daniel J. Preston, Cambridge, MA (US); Stephanie Oyola-Reynoso, Burlington, MA (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 1284 days.

(21) Appl. No.: 17/289,924

(22) PCT Filed: Oct. 29, 2019

(86) PCT No.: PCT/US2019/058465

§ 371 (c)(1),
(2) Date: Apr. 29, 2021

(87) PCT Pub. No.: WO2020/092305

PCT Pub. Date: May 7, 2020

(65) Prior Publication Data

US 2022/0001530 A1 Jan. 6, 2022

Related U.S. Application Data

(60) Provisional application No. 62/752,147, filed on Oct. 29, 2018.

(51) Int. Cl.
*B32B 3/26* (2006.01)
*B25J 9/10* (2006.01)
(Continued)

(52) U.S. Cl.
CPC ............... *B25J 9/1075* (2013.01); *B32B 1/08* (2013.01); *B32B 3/263* (2013.01); *B32B 3/266* (2013.01);
(Continued)

(58) Field of Classification Search
CPC ........ B32B 3/266; B32B 7/022; B25J 9/1075; B25J 11/00; B25J 9/142; B25J 9/14; F15B 15/103
See application file for complete search history.

(56) References Cited

U.S. PATENT DOCUMENTS 7,678,440 B1 3/2010 McKnight et al.
9,283,354 B2 * 3/2016 Kishida ............. A61M 25/0155
(Continued)

FOREIGN PATENT DOCUMENTS

WO WO-2003/081762 A1 10/2003
WO WO-2016/179245 A1 11/2016
WO WO-2018/175744 A1 9/2018

OTHER PUBLICATIONS

Abidi et al., "On Intrinsic Safety of Soft Robots," Frontiers in Robotics and AI, Feb. 20, 2017, vol. 4, article 5. 6 pages.
(Continued)

*Primary Examiner* — Joanna Pleszczynska
(74) *Attorney, Agent, or Firm* — Wilmer Cutler Pickering Hale and Dorr LLP

(57) ABSTRACT

An actuator is described, including a first sheet comprising a plurality of first openings,; and a second sheet comprising a plurality of second openings; wherein the first and second sheets are stacked together such that at least one of the first and second openings are misaligned; and the actuator is configured to move from a first state to a second state, wherein in the first state, out-of-plane motion of the first and second sheets is permitted; and in the second state, the first
(Continued)

and second sheets as well as the misaligned first and second openings are jammed together to restrict the out-of-plane motion of the first and second sheets. Methods of actuating and making such actuator are also described.

24 Claims, 23 Drawing Sheets

(51) Int. Cl.
*B25J 11/00* (2006.01)
*B32B 1/08* (2006.01)
*B32B 7/022* (2019.01)
*F15B 15/10* (2006.01)

(52) U.S. Cl.
CPC ............ *B32B 7/022* (2019.01); *F15B 15/103* (2013.01); *B32B 2307/732* (2013.01)

(56) References Cited

U.S. PATENT DOCUMENTS

| | | | | |
|---|---|---|---|---|
| 9,631,171 | B2 * | 4/2017 | Soman | A61L 27/14 |
| 2006/0028041 | A1 | 2/2006 | Ono et al. | |
| 2010/0022007 | A1 * | 1/2010 | Kenis | B01F 31/65 422/68.1 |
| 2012/0280421 | A1 | 11/2012 | Keating et al. | |
| 2014/0314976 | A1 | 10/2014 | Niiyama et al. | |
| 2015/0107233 | A1 | 4/2015 | Ou et al. | |
| 2017/0239818 | A1 | 8/2017 | Galloway | |
| 2017/0314538 | A1 | 11/2017 | Mazzeo et al. | |
| 2017/0360590 | A1 | 12/2017 | Corrigan et al. | |

OTHER PUBLICATIONS

Ahmed et al., "Brittle-ductile transition of double network hydrogels: Mechanical balance of two networks as the key factor," Polymer, available online Jan. 6, 2014, vol. 55, pp. 914-923.
Akagi et al., "Fracture energy of polymer gels with controlled network structures," J. Chem. Phys., published online Oct. 11, 2013, vol. 139:144905. 7 pages.
Baumgartner et al., "Resilient yet entirely degradable gelatin-based biogels for soft robots and electronics," Nat. Mater., Oct. 2020, vol. 19, pp. 1102-1109, methods and extended date figures. 18 pages.
Blanc et al., "Flexible Medical Devices: Review of Controllable Stiffness Solutions", Actuators, Jul. 11, 2017, vol. 6:23. 31 pages.
Blees et al., "Graphene kirigami," Nature, Aug. 13, 2015, vol. 524, pp. 204-207 with Methods and Figures. 9 pages.
Bouten et al., "The chemistry of tissue adhesive materials," Prog. Polym. Sci., available online Feb. 18, 2014, vol. 39, pp. 1375-1405.
Chen et al., "Flaw sensitivity of highly stretchable materials," Extreme Mechanics Letters (2017), available online Oct. 12, 2016, vol. 10, pp. 50-57.
Choi et al., "A Soft, Controllable, High Force Density Linear Brake Utilizing Layer Jamming," IEEE Robotics and Automation Letters, Jan. 2018, vol. 3(1), pp. 450-457.
Cianchetti et al., "Soft Robotics Technologies to Address Shortcomings in Today's Minimally Invasive Surgery: The Stiff-Flop Approach," Soft Robotics, Jun. 19, 2014, vol. 1, pp. 122-131.
Cianchetti et al., "Stiff-Flop Surgical Manipulator: mechanical design and experimental characterization of the single module," IEEE/RSJ International Conference on Intelligent Robots and Systems (IROS), Nov. 3-7, 2013, pp. 3576-3581.
Crowley et al., "Stability of polyethylene oxide in matrix tablets prepared by hot-melt extrusion," Biomaterials, Nov. 2002, vol. 23, pp. 4241-4248.
Cui et al, "Synthetically simple, highly resilient hydrogels," Biomacromolecules, Feb. 28, 2012, vol. 13, pp. 584-588.
De Gennes, "Reptation of a Polymer Chain in the Presence of Fixed Obstacles," J. Chem. Phys., Jul. 15, 1971, vol. 55, pp. 572-579.
Di Giuseppe, "Analogue materials in experimental tectonics," Reference Module in Earth Systems and Environmental Sciences (Elsevier, 2018). 32 pages.
Dias et al., "Kirigami Actuators" Soft Matter (2017), vol. 13, pp. 9087-9092; arXiv:1707.05477v3, Oct. 7, 2017. 7 pages.
Dimitrov et al., "High-Molecular-Weight Poly(ethylene oxide)," Polymer Science: A Comprehensive Reference, Elsevier, May 2012, vol. 4, pp. 551-569.
Firouzeh et al., "Soft Pneumatic Actuator with Adjustable Stiffness Layers for Multi-DoF Actuation," IEEE/RSJ International Conference on Intelligent Robots and Systems (IROS), Sep. 28 to Oct. 2, 2015, pp. 1117-1124.
Gong et al., "Double-network hydrogels with extremely high mechanical strength," Adv. Mater., Jul. 17, 2003, vol. 15, pp. 1155-1158.
Gong et al., "Friction of Gels. 4. Friction on Charged Gels," J. Phys. Chem. B, published online Jul. 2, 1999, vol. 103, pp. 6007-6014.
Gong, "Friction and lubrication of hydrogels—its richness and complexity," Soft Matter, May 25, 2006, vol. 2, pp. 544-552.
Gong, "Why are double network hydrogels so tough?" Soft Matter, Mar. 9, 2010, vol. 6, pp. 2583-2590.
Grashow et al., "Biaixal Stress-Stretch Behavior of the Mitral Valve Anterior Leaflet at Physiologic Strain Rates," Ann. Biomed. Eng., Feb. 2006, vol. 34(2), pp. 315-325.
Haaf et al., "Polymers of N-vinylpyrrolidone: Synthesis, characterization and uses," Polymer Journal, Jan. 1985, vol. 17, pp. 143-152.
Hallensleben et al., "Polyvinyl compounds, others," Ullmann's Encyclopedia of Industrial Chemistry, Wiley-VCH Verlag GmbH & Co. KGaA (2012), vol. 29, pp. 605-621.
Hao et al. "A variable stiffness soft robotic gripper with low-melting-point alloy," Proceedings of the 36th Chinese Control Conference (CCC), Jul. 26-28, 2017, pp. 6781-6786.
Hassan et al., "Structure and applications of poly(vinyl alcohol) hydrogels produced by conventional crosslinking or by freezing/thawing methods," Advances in Polymer Science, Biopolymers—PVA Hydrogels, Anionic Polymerisation Nanocomposites, online Oct. 20, 2000, vol. 153, p. 37-65.
Herzberger et al., "Polymerization of ethylene oxide, propylene oxide, and other alkylene oxides: Synthesis, novel polymer architectures, and bioconjugation," Chemical Reviews (2016), Dec. 29, 2015, vol. 116, pp. 2170-2243.
Higa et al., "Biocompatibility study for PVP wound dressing obtained in different conditions," Radiat. Phys. Chem., (1999) vol. 55, pp. 705-707.
Hong et al., "3D printing of highly stretchable and tough hydrogels into complex, cellularized structures," Adv. Mater., published online Jun. 1, 2015, vol. 27, pp. 4035-4040.
Hou et al., "Photo-cross-linked PDMSstar-PEG hydrogels: Synthesis, characterization, and potential application for tissue engineering scaffolds," Biomacromolecules, published online Feb. 10, 2010, vol. 11, pp. 648-656.
Hua et al., "Strong tough hydrogels via the synergy of freeze-casting and salting out," Nature, Feb. 25, 2021, vol. 590, pp. 594-599, methods and extended data figures. 13 pages.
International Search Report and Written Opinion mailed Mar. 19, 2020, in the International Application No. PCT/US2019/058465. 20 pages.
Isobe et al., "Initial rigid response and softening transition of highly stretchable kirigami sheet materials," Scientific Reports, Apr. 27, 2016, vol. 6:24758. 6 pages.
Javid et al., "Fatigue exhaustion of the mitral valve tissue," Biomechanics and Modeling in Mechanobiology (2019), published online Aug. 10, 2018, vol. 18, pp. 89-97.
Jiang et al., "3D printing of dual-physical cross-linking hydrogel with ultrahigh strength and toughness," Chem. Mater., Nov. 30, 2020, vol. 32, pp. 9983-9995.
Jiang et al., "Highly Stretchable and Instantly Recoverable Slide-Ring Gels Consisting of Enzymatically Synthesized Polyrotaxane with Low Host Coverage," Chem. Mater., Jul. 17, 2018, vol. 30, pp. 5013-5019.
Karino et al., "Slide-ring gel: Topological gel with freely movable cross-links," Physica B: Condensed Matter, Nov. 15, 2006, vols. 385-386, pp. 692-696.

(56) References Cited

OTHER PUBLICATIONS

Khanlari et al., "Designing crosslinked hyaluronic acid hydrogels with tunable mechanical properties for biomedical applications," J. Appl. Polym. Sci., Feb. 12, 2015, vol. 132:42009. 7 pages.
Kim et al., "Fracture, fatigue, and friction of polymers in which entanglements greatly outnumber cross-links," Science, Oct. 8, 2021, vol. 374, 212-216. 6 pages.
Kong et al., "Independent control of rigidity and toughness of polymeric hydrogels," Macromolecules, published online May 20, 2003, vol. 36, pp. 4582-4588.
Krahn et al., "Controllable biomimetic adhesion using embedded phase change material," Smart Materials and Structures, Dec. 9, 2010, vol. 20:015014. 8 pages.
Lake et al., "The strength of highly elastic materials," Proc. R. Soc. Lond. Ser. Math. Phys. Sci., Aug. 22, 1967, vol. 300:1460, pp. 108-119.
Lee et al., "Hydrogels for tissue engineering," Chem. Rev., Jul. 2001, vol. 101:7, pp. 1869-1879.
Lin et al., "Anti-fatigue-fracture hydrogels," Sci. Adv., Jan. 25, 2019, vol. 5:eaau8528. 9 pages.
Lin et al., "Fracture and fatigue of ideal polymer networks," Extreme Mech. Lett., available online Jun. 23, 2021, vol. 48:101399. 11 pages.
Lin et al., "PEG hydrogels for the controlled release of biomolecules in regenerative medicine," Pharma. Res., Mar. 2009, vol. 26, pp. 631-643.
Lin et al., "Soft Fingers with Controllable Compliance to Enable Realization of Low Cost Grippers," Living Machines, presented at Conference on Biomimetic and Biohybrid Systems, online: Jul. 16, 2017, LNAI 10384, pp. 544-550.
Liu et al., "Tough hydrogels with rapid self-reinforcement," Science, Jun. 4, 2021, vol. 372, pp. 1078-1081.
Liu et al., "Polyacrylamide hydrogels. II. elastic dissipater," Journal of the Mechanics and Physics of Solids, available online Sep. 18, 2019, vol. 133:103737. 11 pages.
Majidi, "Soft Robotics: A Perspective—Current Trends and Prospects for the Future," Soft Robotics (2014), online Jul. 17, 2013, vol. 1, p. 5-11.
Manti et al., "Stiffening in Soft Robotics, A Review of the State of the Art," IEEE Robotics & Automation Magazine, Sep. 2016, vol. 23, pp. 93-106.
Mitsuda, "Variable-stiffness Sheets Obtained using Fabric Jamming and their applications in force displays", Proceedings of the IEEE World Haptics Conference (WHC), Jul. 27, 2017, 364-369. DOI: 10.1109/WHC.2017.7989929. 7 pages.
Mosadegh et al., "Pneumatic Networks for Soft Robotics that Actuate Rapidly," Advanced Functional Materials, published online Jan. 10, 2014, vol. 24, pp. 2163-2170.
Norioka et al., "A universal method to easily design tough and stretchable hydrogels," NPG Asia Materials, published online Apr. 9, 2021, vol. 13:34. 10 pages.
Okumura et al., "The polyrotaxane gel: A topological gel by figure-of-eight cross-links," Adv. Mater., Apr. 4, 2001, vol. 13:7, pp. 485-487.
Ou et al., "jamSheets: Thin Interfaces with Tunable Stiffness Enabled by Layer Jamming", In Proceedings of the 8th International Conference on Tangible, Embedded and Embodied Interaction (TEI '14). ACM, New York, NY, USA (2014), 65-72. 9 pages.
Peppas et al., "Crosslinked poly(vinyl alcohol) hydrogels as swollen elastic networks," J. Appl. Polym. Sci., Jul. 1977, vol. 21, pp. 1763-1770.
Pereira et al., "Ranking the fracture toughness of thin mammalian soft tissues using the scissors cutting test," J. Biomech., Jan. 1997, vol. 30, pp. 91-94.
Pike et al., "Mastication of rubber. I. Mechanism of plasticizing by cold mastication," J. Polym. Sci., Sep. 1952, vol. 9, pp. 229-251.
Polygerinos et al., "Soft Robotics: Review of Fluid-Driven Intrinsically Soft Devices; Manufacturing, Sensing, Control, and Applications in Human-Robot Interaction," Advanced Engineering Materials, May 31, 2017, vol. 19, No. 12, 1700016. 22 pages.
Rafsanjani et al., "Buckling-induced Kirigami," Phys. Rev. Letters, Feb. 24, 2017, PRL 118:084301. 5 pages.
Reis et al., "Reaction of glycidyl methacrylate at the hydroxyl and carboxylic groups of poly(vinyl alcohol) and poly(acrylic acid): Is this reaction mechanism still unclear?" J. Org. Chem., published online Apr. 10, 2009, vol. 74, pp. 3750-3757.
Rus et al., "Design, fabrication and control of soft robots," Nature, May 28, 2015, vol. 521, pp. 467-475.
Sakai et al., "Design and fabrication of a high-strength hydrogel with ideally homogeneous network structure from tetrahedron-like macromonomers," Macromolecules, published online Jun. 21, 2008, vol. 41, pp. 5379-5384.
Schubert et al., "Variable stiffness material based on rigid low-melting-point-alloy microstructures embedded in soft poly(dimethylsiloxane) (PDMS)," RSC Advances, Oct. 16, 2013, 3(46):24671. 11 pages.
Stauffer et al., "Poly(vinyl alcohol) hydrogels prepared by freezing-thawing cyclic processing," Polymer, Sep. 1992, vol. 33, No. 18, pp. 3932-3936.
Steltz et al., "Jamming as an enabling technology for soft robotics," Proceedings of SPIE, Apr. 9, 2010, vol. 7642:764225. 10 pages.
Sun et al., "Highly stretchable and tough hydrogels," Nature, Sep. 6, 2012, vol. 489, pp. 133-136.
Tanaka et al., "Determination of fracture energy of high strength double network hydrogels," J. Phys. Chem. B, published online May 19, 2005, vol. 109, pp. 11559-11562.
Trowbridge et al., "The extension rate independence of the hysteresis in glutaraldehyde-fixed bovine pericardium," Biomaterials, May 1987, vol. 8, pp. 201-206.
Vernengo, "Adhesive materials for biomedical applications," Adhesives—Applications and Properties, Nov. 23, 2016, Chapter 4, pp. 99-136.
Wall et al., "Selective stiffening of soft actuators based on jamming," IEEE International Conference on Robotics and Automation (ICRA), May 26-30, 2015, pp. 252-257.
Wang et al., "Stretchable materials of high toughness and low hysteresis," Proc. Natl. Acad. Sci., Mar. 26, 2019, vol. 116, pp. 5967-5972.
Webber et al., "Large strain hysteresis and mullins effect of tough double-network hydrogels," Macromolecules, published online Mar. 21, 2007, vol. 40, p. 2919-2927.
Wei et al., "A Novel, Variable Stiffness Robotic Gripper Based on Integrated Soft Actuating and Particle Jamming," Soft Robotics 2016, vol. 3, No. 3, pp. 134-143.
Xu et al., "A solvent-exchange strategy to regulate noncovalent interactions for strong and antiswelling hydrogels," Adv. Mater., published online Nov. 9, 2020, vol. 32:2004579. 7 pages.
Yang et al., "A synthetic hydrogel composite with the mechanical behavior and durability of cartilage," Adv. Funct. Mater., published online Jun. 26, 2020, vol. 30:2003451. 8 pages.
Zhang et al., "Fatigue of double-network hydrogels," Engineering Fracture Mechanics (2018), available online Oct. 27, 2017, vol. 187, p. 74-93.
Zhao, "Multi-scale multi-mechanism design of tough hydrogels: building dissipation into stretchy networks," Soft Matter (2014), Oct. 29, 2013, vol. 10, pp. 672-687.

* cited by examiner

| | $W_S$ (mm) | $C_S$ (mm) | $C_l$ (mm) | $h$ (mm) |
|---|---|---|---|---|
| 1 | 29 | 8.5 | 18 | 3 |
| 2 | 29 | 10 | 21 | 3 |
| 3 | 29 | 12 | 24 | 3 |
| 4 | 19.5 | 8 | 16 | 3 |

502

504

FIG. 10A
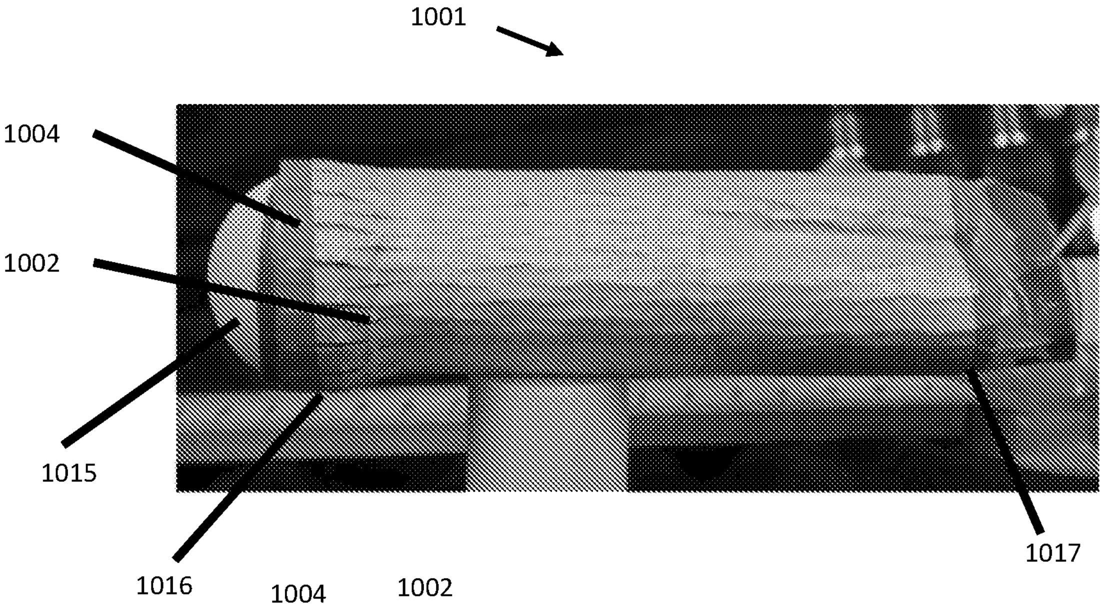
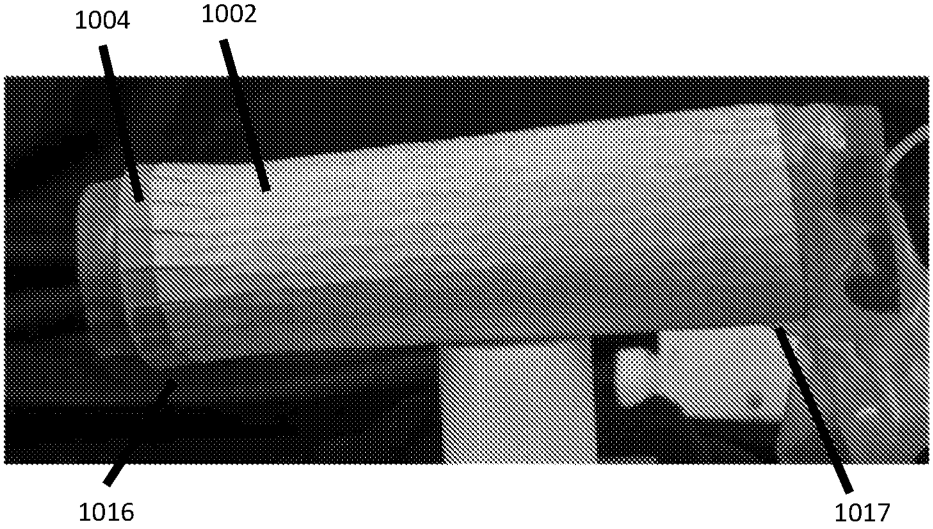
FIG. 10B deformed then jammed

FIG.
15B

COMPOSITE ACTUATOR

RELATED APPLICATIONS

The present application is a U.S. National Stage application under 35 U.S.C. § 371 of International Patent Application No. PCT/US2019/058465, filed Oct. 29, 2019, which claims the benefit of priority to U.S. Provisional Application No. 62/752,147, filed on Oct. 29, 2018, both of which are hereby incorporated by reference in their entireties.

STATEMENT REGARDING FEDERALLY SPONSORED RESEARCH OR DEVELOPMENT

This invention was made with government support under 1420570 awarded by the National Science Foundation and DE-SC0000989 awarded by the U.S. Department of Energy. The government has certain rights in the invention.

INCORPORATION BY REFERENCE

All patents, patent applications and publications cited herein are hereby incorporated by reference in their entirety in order to more fully describe the state of the art as known to those skilled therein as of the date of the invention described herein.

FIELD OF THE INVENTION

The instant application relates generally to actuators. More particularly, the instant application relates to actuators of variable stiffness.

SUMMARY

In one aspect, an actuator is described, including a first sheet including a plurality of first openings; and a second sheet including a plurality of second openings; wherein the first and second sheets are stacked together such that at least one of the first and second openings are misaligned; and the actuator is configured to move from a first state to a second state, wherein in the first state, out-of-plane motion of the first and second sheets is permitted; and in the second state, the first and second sheets as well as the misaligned first and second openings are jammed together to restrict the out-of-plane motion of the first and second sheets.

In some embodiments, the stiffness of the actuator in the second state is at least 5-100 times of the stiffness of the actuator in the first state.

In some embodiments, at least one of the first and second sheets comprise a material selected from the group consisting of metals, ceramics, polymers, elastomers, paper, woven textiles, nonwoven textiles, magnetic materials, graphene and combinations thereof.

In some embodiments, the first and second sheets have different thicknesses.

In some embodiments, at least one of the first and second sheets has a nonuniform thickness.

In some embodiments, the actuator includes a porous, extensible sheet disposed between the first and second sheets.

In some embodiments, the actuator further includes a sleeve enclosing the first and second sheets and connected to a vacuum; wherein the sleeve is under vacuum at the second state.

In some embodiments, the sleeve is an extensible material.

In some embodiments, the sleeve is folded.

In some embodiments, the extensible material is selected from the group consisting of rubber, polyurethane, latex, silicone and combinations thereof.

In some embodiments, the interior of the sleeve is filled with a fluid.

In some embodiments, the fluid has a viscosity that is responsive to an external stimulus.

In some embodiments, the fluid is a non-Newtonian fluid.

In some embodiments, the first and second sheets are magnetically attractive to each other in the second state such that the first and second sheets are jammed together.

In some embodiments, each of the first and second sheets comprises a positive magnetic surface and negative magnetic surface, and the first and second sheets are stacked such that the positive magnetic surface of a first sheet is engaged with the negative magnetic surface of a second sheet.

In some embodiments, the first and second sheets are electrically attractive to each other in the second state such that the first and second sheets are jammed together.

In some embodiments, each of the first and second sheets comprises a first and second conducting surface and an insulating material between the first and second conducting surfaces.

In some embodiments, the first and second sheets comprise patterned electrodes.

In some embodiments, the first and second sheets are jammed together.

In some embodiments, the first and second sheets are adhered together in the second state such that the first and second sheets are jammed together.

In some embodiments, the actuator further comprises an adhesive disposed on the surfaces of each of the first and second sheets facing each other.

In some embodiments, the adhesive is selected from the group consisting of pressure sensitive adhesives, mechanical adhesives, van der Waals based reversible adhesives, interlocking adhesives, switchable adhesives, tape, shape memory polymers and combinations thereof.

In some embodiments, the adhesive is actuated by a stimulus selected from the group consisting of heat, light, chemical stimuli, pressure, external forces, electric fields, magnetic fields, and combinations thereof.

In some embodiments, the first sheet further includes a plurality of third openings; and the second sheet further includes a plurality of fourth openings; wherein the first and second sheets are stacked together such that at least one of the third and fourth openings are misaligned; and the actuator is configured such that the misaligned third and fourth openings are capable of being jammed together independent of the misaligned first and second openings.

In some embodiments, the lengths of the first openings are at least three times greater than the widths of the first opening; and the lengths of the second openings are at least three times greater than the widths of the second openings.

In some embodiments, the lengths of the first openings are at least five times greater than the widths of the first opening; and the lengths of the second openings are at least five times greater than the widths of the second openings.

In some embodiments, the lengths of the first openings are at least ten times greater than the widths of the first opening; and the lengths of the second openings are at least ten times greater than the widths of the second openings.

In some embodiments, the first openings are arranged to form a first pattern and the second openings are arranged to form a second pattern.

In some embodiments, at least one of the first and second patterns include randomly oriented openings with respect to each other.

In some embodiments, at least one of the first and second patterns include openings oriented parallel to each other.

In some embodiments, at least one of the first and second openings include curved openings.

In some embodiments, the curved openings include triangular openings, semi-circular openings, rectangular openings, parabolic openings, sinusoidal openings, trapezoidal openings, and half-oval openings.

In some embodiments, one of the first openings and the second openings has a variable width along their lengths.

In some embodiments, at least one of the first and second patterns include openings at angles to each other.

In some embodiments, the first pattern and the second pattern include openings having the same dimensions, orientations, spacing, or locations.

In some embodiments, the first pattern and the second pattern comprise openings having different dimensions, orientations, spacing, or locations.

In some embodiments, at least one of the first openings and at least one of the second openings is interlocking.

In some embodiments, the actuator includes a first plurality of scorings oriented perpendicular to the first openings and a plurality of scorings oriented perpendicular to the second openings.

In some embodiments, the first and second openings are misaligned with respect to each other by an angle of from about 5° to about 50°.

In some embodiments, the first and second patterns are periodic.

In some embodiments, the first and second openings are misaligned by an offset pitch.

In some embodiments, at least one of the first and second patterns comprise a two-dimensional, periodic array of alternating first regions of openings parallel to a first axis and second regions of openings parallel to a second axis, wherein the second axis is perpendicular to the first axis.

In some embodiments, the actuator consists essentially of the first and second sheets.

In some embodiments, the actuator comprises three or more sheets.

In some embodiments, the stiffness of the actuator in the first state and the stiffness of the actuator in the second state are measured in bending, compression, tension, torsion, or a combination thereof In some embodiments, the stiffness of the actuator in the second state is at least 1000 times greater than the stiffness of the actuator in the first state.

In some embodiments, the stiffness of the actuator in the second state is at least 200 times greater than the stiffness of the actuator in the first state.

In some embodiments, the actuator has a negative or zero Poisson's ratio in the plane of the actuator.

In some embodiments, the first and second sheets are arranged together in a tube shape.

In some embodiments, the actuator includes a balloon disposed within the tube.

In some embodiments, radial expansion of the tube is permitted in the first state and radial expansion is constrained in the second state.

In one aspect, a method for actuation includes providing an actuator of any one of the preceding claims and actuating the actuator from the first state to the second state.

In some embodiments of the method, first and second sheets of the actuator are enclosed within a sleeve comprising an extensible material.

In some embodiments, actuating the actuator comprises applying a vacuum to the interior of the sleeve.

In some embodiments, actuating the actuator comprises applying a pressure to the exterior of the sleeve.

In some embodiments, each of the first and second sheets comprises a positive magnetic surface and negative magnetic surface, and the first and second sheets are stacked such that the positive magnetic surface of a first sheet is engaged with the negative magnetic surface of a second sheet.

In some embodiments, actuating the actuator comprises applying a magnetic field.

In some embodiments, each of the first and second sheets comprises a first and second conducting phase and an insulating material between the first and second conducting surfaces.

In some embodiments, actuating the actuator comprises applying an electric field.

In some embodiments, each of the first and second sheets further comprises an adhesive disposed on the surfaces of each of the first and second sheets facing each other.

In some embodiments, actuating the actuator comprises applying a stimulus selected from the group consisting of heat, light, chemical stimuli, and combinations thereof to adhere the first and second sheets together.

In some embodiments, the method further includes applying a deformation to the actuator while in the first state.

In some embodiments, the method further includes maintaining the actuator in the second state to maintain the deformation.

In some embodiments, the method further includes returning the actuator to the first state to remove the deformation.

In another aspect, a method of making the actuator described in any one of the embodiments described herein is disclosed, including providing a first sheet; creating a plurality of first openings in the first sheet each having high aspect ratio; providing a second sheet; creating a plurality of second openings in the second sheet each having high aspect ratio; and stacking the first and second sheets such that a portion of the first and second openings are misaligned.

In some embodiments, the method further includes disposing the first and second sheets within a sleeve.

In some embodiments, the plurality of the first and second openings are created by a method selected from the group consisting of laser cutting, perforating, punching, water jet cutting, milling, lithographic patterning, soft lithographic patterning, casting, molding, dry etching, wet chemical etching, deep reactive ion etching, sawing, cutting, scoring and tearing, freezing and fracturing, direct additive manufacturing methods such as fused deposition modeling, stereolithography, selective laser sintering, 3D printing, and laminated object manufacturing.

In some embodiments, the method further includes arranging the first and second sheets to form a tube.

Any aspect or embodiment disclosed herein can be combined with another aspect or embodiment disclosed herein. The combination of one or more embodiments described herein with other one or more embodiments described herein is expressly contemplated.

DESCRIPTION OF THE DRAWINGS

The application is described with reference to the following figures, which are presented for the purpose of illustration only and are not intended to be limiting. In the Drawings:

FIG. 1A shows an actuator in the first state, where out-of-plane motion is permitted, according to some embodiments. FIG. 1B shows an actuator in the second state where out-of-plane motion is restricted, according to some embodiments. FIG. 1C shows a model of the stiffness of an actuator including a sleeve, with the stiffness of the stacked sheets and the stiffness of the sleeve are modeled in parallel, according to some embodiments. FIG. 1D shows a schematic of an actuator including two stacked kirigami sheets and a sleeve. FIG. 1E shows a stack of four unconstrained kirigami sheets with no load applied, according to some embodiments. FIG. 1F shows a stack of four unconstrained kirigami sheets with a tensile load applied, where the sheets are free to rotate out-of-plane, according to some embodiments. FIG. 1G shows a force-displacement graph, showing a comparison of the stiffness of an actuator without a sleeve and the stiffness of an actuator with a sleeve, but no vacuum applied, according to some embodiments. FIG. 1H shows a force-displacement graph, showing a comparison of the stiffness of an actuator with a sleeve and no vacuum applied (unjammed) with the stiffness of an actuator with a sleeve and a vacuum applied (jammed), according to some embodiments.

FIG. 2A shows an actuator where the magnetic surfaces of the magnetic sheets are facing away from each other, according to some embodiments. FIG. 2B shows an actuator where the magnetic surfaces of the magnetic sheets are facing toward each other and the openings are aligned, according to some embodiments. FIG. 2C shows an actuator where the magnetic surfaces of the magnetic sheets are facing toward each other and the openings are misaligned, according to some embodiments. FIG. 2D shows a force-displacement graph for the aligned actuator of FIG. 2B, the misaligned actuator of FIG. 2C, and an actuator with a single sheet, according to some embodiments.

FIG. 3A shows an actuator that includes two sheets made of Kapton tape (a polyimide film with a silicone adhesive), according to some embodiments. FIG. 3B shows an actuator that includes a sheet of Kapton tape and a sheet of polyester, according to some embodiments. FIG. 3C shows an actuator that includes a sheet of gecko adhesive and a sheet of polyester, according to some embodiments.

FIG. 5A shows a schematic of a first sheet and a second sheet with bidirectional, periodic pattern of openings, according to some embodiments. FIG. 5B shows a force applied to the bidirectional sheets. FIG. 5C shows a force applied to the stacked, bidirectional sheets, according to some embodiments. FIG. 5D shows the full stiffness model for unjammed sheets, according to some embodiments. FIG. 5E shows the simplified stiffness model for unjammed sheets, according to some embodiments. FIG. 5F shows the full equivalent stiffness model for unjammed sheets, according to some embodiments. FIG. 5G shows the full stiffness model for jammed sheets, according to some embodiments. FIG. 5H shows the simplified stiffness model for unjammed sheets, according to some embodiments. FIG. 5I shows the full equivalent stiffness model for unjammed sheets, according to some embodiments.

FIG. 7A shows two sheets with misaligned, parallel openings, according to some embodiments. FIG. 7B shows two sheets with misaligned, curved openings, according to some embodiments. FIG. 7C shows two interlocked sheets with curved openings, according to some embodiments. FIG. 7D shows two interlocked sheets with curved openings and different colors, according to some embodiments.

FIG. 9A shows schematics of various cross-sections of the tube actuators, according to some embodiments. FIG. 9B shows a U-shaped actuator, according to some embodiments. FIG. 9C shows a triangular actuator, according to some embodiments. FIG. 9D shows a jammed tube actuator supporting a load, according to some embodiments.

FIGS. 10A-B show a method of changing the cross-section of a tube actuator, according to some embodiments. FIG. 10A shows that the cross-section is changed by inserting a ball into the end of the tube and jamming the tube, according to some embodiments. FIG. 10B shows that a changed cross-section can be maintained by maintaining the jammed state, according to some embodiments.

FIG. 11A shows the stacked sheets, according to some embodiments. FIG. 11B shows the sheets rolled into a tube, according to some embodiments. FIG. 11C shows a sleeve enclosing the tube, according to some embodiments. FIG. 11D shows a sleeve that encloses the sheets and end pieces that form a sealed tube when assembled, according to some embodiments. FIG. 11E shows two sheets with openings, according to some embodiments. FIG. 11F shows the actuator in a jammed state where the tube cannot expand radially, according to some embodiments. FIG. 11G shows the actuator in an unjammed state where the tube can expand radially, according to some embodiments.

In FIG. 12A, the actuator is in an unjammed state, according to some embodiments. In FIG. 12B, a deformation is applied in the unjammed state and the actuator is jammed, according to some embodiments. In FIGS. 12C and 12D the actuator maintains the deformation while in the jammed state, according to some embodiments. In FIG. 12E, the deformation is released when the actuator returns to the unjammed state, according to some embodiments.

FIG. 13A shows a narrow actuator in a first, unjammed state (left) that contracts into a second, jammed state (right) , according to some embodiments. FIG. 13B shows a wide actuator in a first, unjammed state (left) that contracts into a second, jammed state (right), according to some embodiments.

FIG. 14A shows a jammed actuator with a weight, FIG. 14B shows an unjammed actuator with the weight, FIG. 14C shows a jammed actuator with the weight after the elongation of FIG. 14B, FIG. 14D shows a jammed actuator after the weight is removed, and 14E shows the actuator after it has been unjammed and jammed again, according to some embodiments.

FIGS. 15A-15B show use of the actuator in a pneumatic network soft robot (pneunet), according to some embodiments. FIG. 15A shows a configuration where two actuators are attached to the top and bottom of the pneunet, according to some embodiments. FIG. 15B shows a configuration where two actuators are attached to the sides of the pneunet, according to some embodiments.

DETAILED DESCRIPTION

Figure 1A:
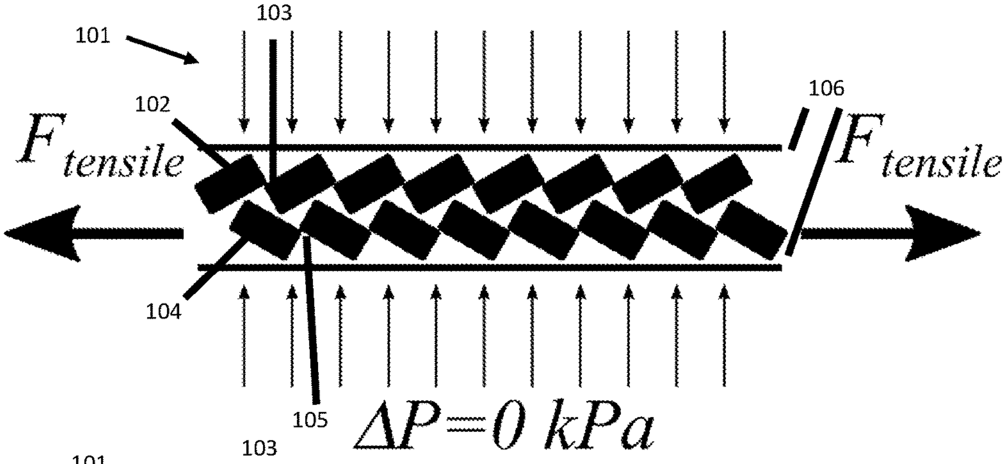
FIGS. 1A-1H demonstrate the principle of an actuator according to one or more embodiments described herein, including a sleeve enclosing stacked sheets.

The use of soft robotics for assembly, physiotherapy and locomotion has become increasingly popular in academic research over the last decade. The safety advantages, low costs, and simple construction of robots made of soft materials have made soft robots a very attractive alternative to rigid robotic systems for collaborative systems operating in close proximity to human users. Strain limiting layers in soft robots are combined with inflatable components to create specific types of actuation, including bending and twisting. Until now, the strain limiting layer has been primarily a passive structure. Beyond the field of soft robotics, there has been a significant interest in switchable modulus materials for smart composites, including jamming actuators, phase changing materials, and shape memory polymer-based designs. Materials that can change their stiffness by orders of magnitude are desirable to adjust soft robot properties, but current solutions all have limitations or drawbacks. Certain jamming actuators can rapidly change stiffness, but do not change shape during the jamming process. In this case, negligible work is done by the actuator when jamming is triggered and little or no restoring force is available to return the actuator to its original position when reverted to an unjammed state. At normal atmospheric conditions, the maximum tensile loading that can be supported for particulate jamming is approximately 100 kPa and so these actuators normally support compression or bending loads. Shape memory polymers can change their modulus by several orders of magnitude, but with thermal control, and its switching time can be very slow and is dominated by thermal diffusivity and volume of material. Phase change materials have the same issues with slow switching time, with switching modulus taking 10's or 100's of seconds. Within the literature, a composite material that can rapidly (<1 s) and reversibly switch its tensile modulus, and would be suitable for integration with soft robotics, has not been reported. This particular capability would be desirable as a means to change tensile compliance specifically for use as strain limiting layers within soft robots that switch degree and axis of compliance. Kirigami springs are formed by making openings or cuts with high aspect ratios in sheets. Kirigami springs have typically been used to convert inextensible thin-films of rigid material into springs by allowing out-of-plane buckling to reduce stresses within the plane which greatly enhances the in-plane compliance.

In one aspect, an actuator is described, including a first sheet including a plurality of first openings; and a second sheet including a plurality of second openings; where the first and second sheets are stacked together such that at least one of the first and second openings are misaligned; and the actuator is configured to move from a first state to a second state, wherein in the first state, out-of-plane motion of the first and second sheets is permitted; and in the second state, the first and second sheets as well as the misaligned first and second openings are jammed together to restrict the out-of-plane motion of the first and second sheets.

In certain embodiments, "kirigami sheet" can refer to a planar sheet with a plurality of openings and/or cuts each with high aspect ratios. The openings can permit out-of-plane movement or rotation of the sheet. In certain embodiments, "high aspect ratio" can refer to a cut or opening having dimensions such that its length is much greater, e.g., 100, 90, 80, 70, 60, 50, 40, 30, 20, 15, 10, 9, 8, 7, 6, 5, 4, 3, or 2 times greater, than its width, or the ratios of its length to its width is with a range bounded by any of two numbers disclosed herein. In certain embodiments, "misaligned" can refer to a spatial mismatch between the openings or patterns of openings of adjacent sheets. In some embodiments, "misaligned" refers to the situation where two openings each have an axis along their longest dimensions (their lengths) and the two axes are disposed at an angle to each other. In some embodiments, the angle is between 0 and 180 degrees, between 0 and about 120 degrees, between 0 and about 90 degrees, between 0 and about 45 degrees, between 0 and about 30 degrees, between about 30 and 180 degrees, between about 30 and 120 degrees, between about 30 and 90 degrees, between about 30 and 45 degrees, between about 45 and 180 degrees, between about 45 and 120 degrees, between about 45 and 90 degrees, between about 60 and 180 degrees, between about 60 and 120 degrees, between about 60 and 90 degrees, between about 90 and 180 degrees, between about 90 and 120 degrees, between about 120 and 180 degrees. In some specific embodiments, the angle is about 15, 30, 45, 60, 75, 90, or 120 degrees. In other embodiments, "misaligned" refers to a situation where two openings are offset by a distance in translation.

In some embodiments, described herein are actuators switchable between a low-stiffness first state to a high-stiffness second state upon actuation. In some embodiments, the actuator described herein has a simple design with variable stiffness. In some embodiments, these actuators have applications within the fields of shape-memory metamaterials, soft robots, and composite manufacturing. In certain embodiments, the high-stiffness is achieved by the jamming together of two sets of openings from two sheets, thus limiting the out-of-plane motion of the actuator. In some embodiments, the stiffness of the actuator can be varied based on the materials of the sheets, the number of sheets and/or the patterns of openings in the sheets.

Figure 1B:
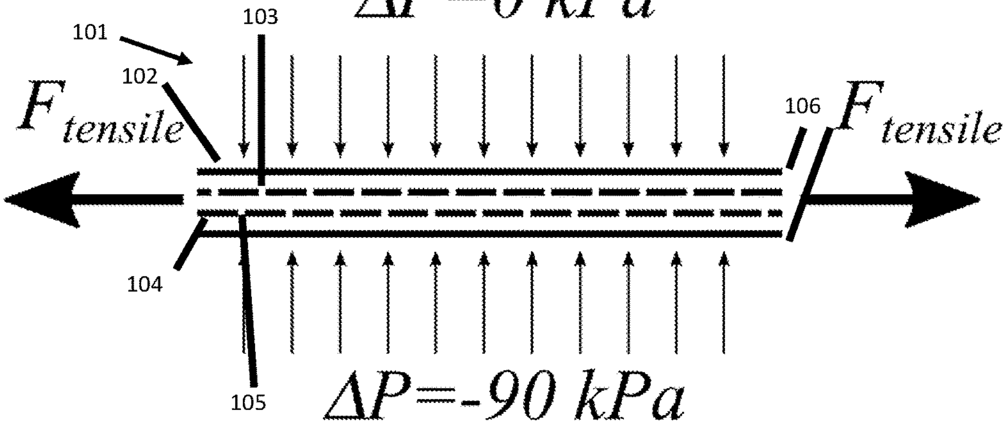
Figure 1C:
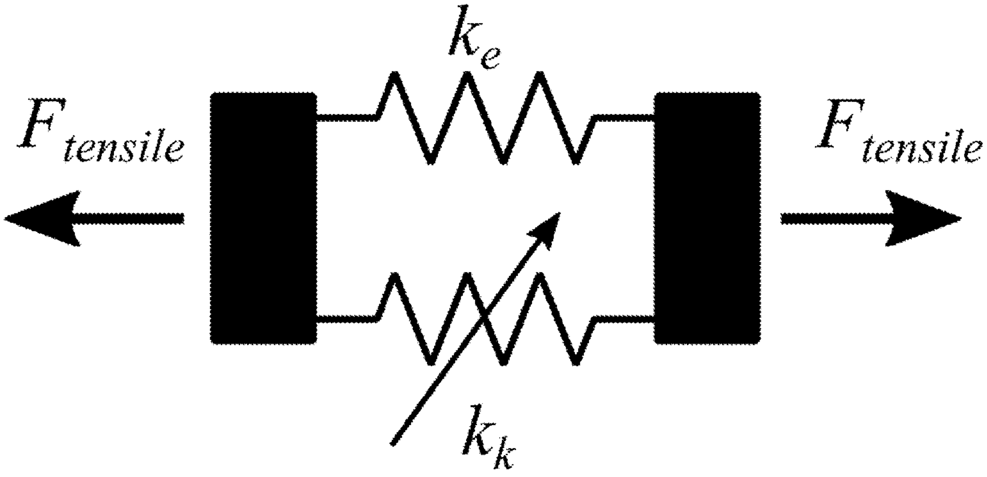

In certain embodiments, "jammed" can refer to a state where the one or more misaligned first and second openings are in close contact with each other and lock onto each other such that out-of-plane motion of the first and second sheets is restricted or constrained. In some embodiments, the out-of-plane motion of the first and second sheets can be restricted by the application of a force jamming the first and second openings together. The actuator disclosed herein is now described with reference to FIG. 1A and FIG. 1B. FIG. 1A shows an actuator 101 including a first sheet 102 including a first set of openings 103 and a second sheet 104 including a second set of openings 105 stacked in a first, unconstrained state. In this first state, the sleeve 106 is not subjected to any vacuum (as shown in FIG. 1A, ΔP is 0 kPa), out-of-plane motion is permitted, and the openings allow the first sheet 102 and second sheet 104 to rotate with respect to one another. FIG. 1B shows the actuator 101 including the first sheet 102 including the first set of openings 103 and the second sheet 104 including the second set of openings 105 stacked together in a second, constrained state. In this second state, the sleeve 106 is subjected to a vacuum (as shown in FIG. 1B, ΔP is −90 kPa), which pushes and jams together the two sheets 102 and 104 as well as the first and second openings 103 and 105. Thus, out-of-plane motion of the actuator is restricted, and the first sheet 102 and second sheet 104 cannot rotate with respect to one another. In this embodiment, the stiffness of the actuator can be modeled with the stiffness of the stacked sheets and the stiffness of the sleeve in parallel, as shown in FIG. 1C. $K_e$ represents the stiffness of the sleeve, while $K_k$ represents the stiffness of the sheets.

In some embodiments, the stiffness of the actuator in the second state is at least about 5-100 times of the stiffness of the actuator in the first state. In some embodiments, the stiffness of the actuator in the second state is at least about 5, 10, 20, 50, or 100 times the stiffness of the actuator in the first state, or ratio of the stiffness of the second state to that of the first state is in a range bounded by any two values disclosed herein.

Figure 1D:
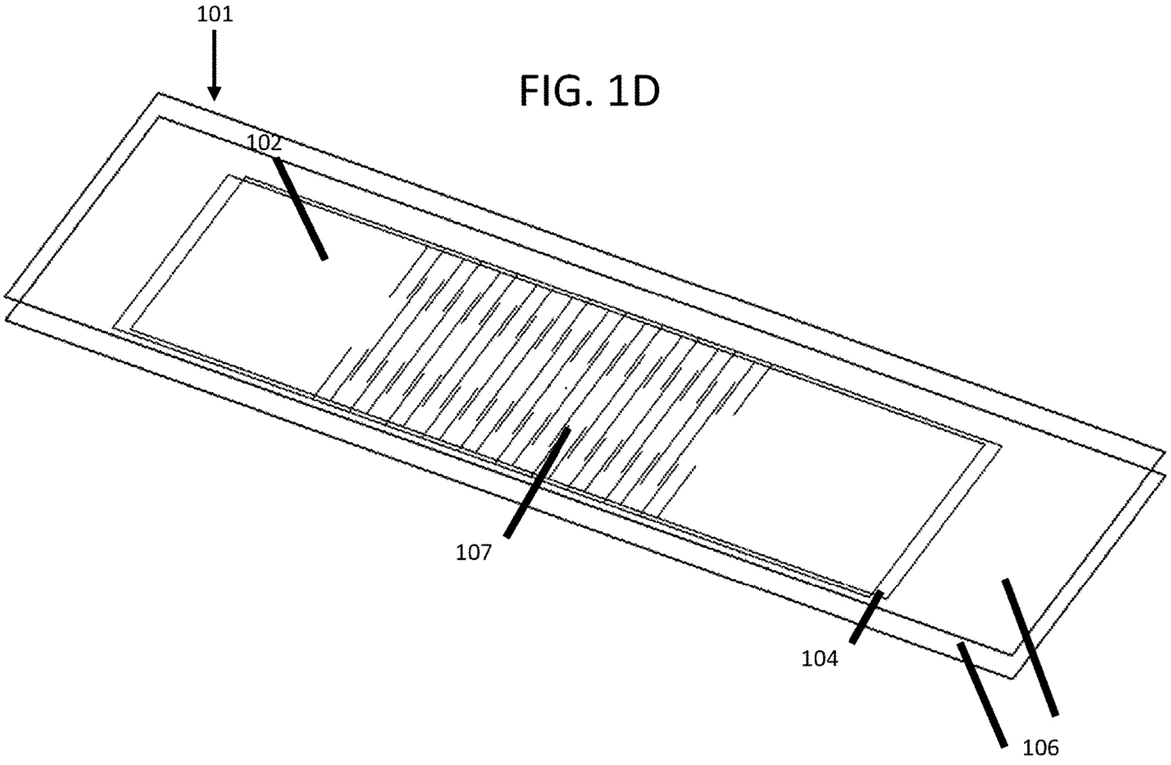
Figure 1E:
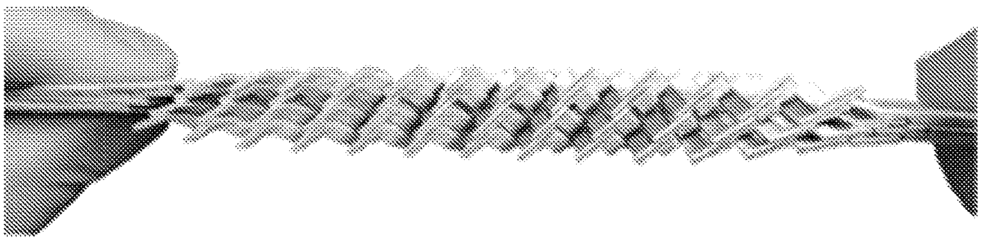
Figure 1F:
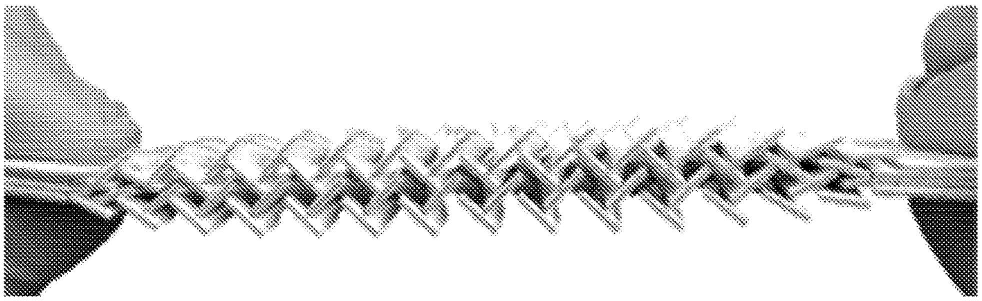

FIG. 1E and FIG. 1F show the out-of-plane movement, for example, of an actuator having a stack of four kirigami sheets with openings perpendicular to the long axis of the actuator. In FIG. 1E, no force is applied to the kirigami sheets. In FIG. 1F, a tensile force is applied along an axis perpendicular to the openings and parallel to the long axis of the actuator, causing the kirigami sheets to rotate and the openings of the adjacent sheets to jam together. As a result, the actuator is jammed, the out-of-plane buckling of the actuator is constrained, and the cut sheets cannot deform in this more energy-efficient mode, and the stiffness of the actuator is greatly increased. Accordingly, as described herein, when the openings of the sheets of the actuators are misaligned and jammed, the beams or struts 107 formed by the openings are not permitted to rotate out-of-plane.

In some embodiments, the stiffness of the actuator in the first state and the stiffness of the actuator in the second state are measured in bending, twisting, compression, tension, torsion, or a combination thereof.

In some embodiments, the stiffness of the actuator in the second state is about 1000 times stiffer than the stiffness in the first state. In other embodiments the stiffness of the actuator in the second state is about 200 times stiffer than the stiffness in the first state. The stiffness of the second state can be about 1000, 900, 800, 700, 600, 500, 400, 300, or 200 times stiffer than the stiffness of the first state, or ratio of the stiffness of the second state to that of the first state is in a range bounded by any two values disclosed herein.

In some embodiments, the actuator is auxetic and has a negative or zero Poisson's ratio in the plane of the actuator. In this embodiment, as a force is applied to the actuator axially, the actuator expands in a perpendicular axis.

I. Sheets

In some embodiments, the actuator includes the first and second sheets. In some embodiments, the actuator includes two or more sheets. In other embodiments the actuator can include additional sheets. In some embodiments, as the number of sheets increases, the stiffness of the actuator increases. For example, an actuator formed of many thin sheets can have a greater stiffness switching ratio than an actuator with the same total thickness formed of fewer, thicker sheets made of the same material.

In some embodiments the sheets can include metals, ceramics, polymers, elastomers, paper, woven textiles, non-woven textiles, magnetic materials, graphene and combinations thereof. Non-limiting examples of metals include spring steels, stainless steels, high carbon steels, Inconel super alloys, copper-beryllium alloys, superelastic nitinol, monel alloys and bulk metallic glasses. Non-limiting examples of ceramics include quartz, sapphire, Alkali aluminosilicate glasses, aluminium oxynitride, and superelastic zirconia. Non-limiting examples of polymers include epoxies, polyesters, polyamides, polyimides, polycarbonate, polyether ether ketone (PEEK), Polyoxymethylene, polyurethanes, and elastomers including silicones, natural rubbers and artificial rubbers, liquid crystal elastomers, shape memory polymers, fluoroelastomers, and fluorosilicones. In some embodiments, any of these materials can include composite reinforcement via embedded fibers, fabrics, particles or platelets for tuning mechanical, electrical or thermal properties. In some embodiments, the sheets are made from different materials.

In some embodiments, at least one sheet can have a variable thickness. In some embodiments, the first and second sheets can have different thicknesses. In some embodiments, at least one sheet has a non-uniform thickness that varies within that sheet. In some embodiments, a non-uniform thickness encourages a preferred direction of out-of-plane rotation, eliminating the need to pre-condition or pre-deform the sheets.

In some embodiments, at least one sheet can have a variable coefficient of friction. In some embodiments, a variable coefficient of friction arises from sheets made of different materials. In some embodiments, a variable coefficient of friction arises from sheets having surface roughness. In some embodiments, surface roughness takes the form of arrays of pillars or other topographical features. In some embodiments, two sheets with surface roughness can interlock or have high surface friction such that out-of-plane and bending stiffness increases once jammed.

In some embodiments, the actuator further comprises an, extensible sheet or membrane between two adjacent sheets with at least one hole. In some embodiments, a membrane with at least one sheet is impermeable but allows a vacuum to be applied in the actuator simultaneously, e.g., through the hole. In some embodiments, the actuator includes porous, extensible sheet that can prevent accidental interlocking or tangling of the first and second sheet while allowing vacuum jamming to occur across the whole actuator. Non-limiting examples of a porous, extensible sheet or a sheet with at least one hole include spandex, rubber or perforated latex.

II. Jamming Mechanisms

A. Pneumatic Jamming

Figure 1G:
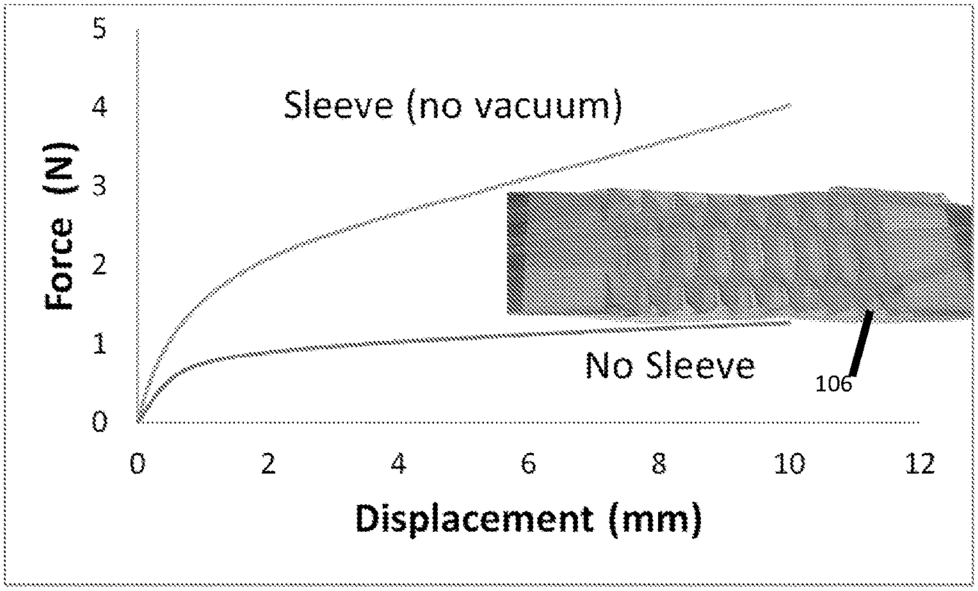
Figure 1H:
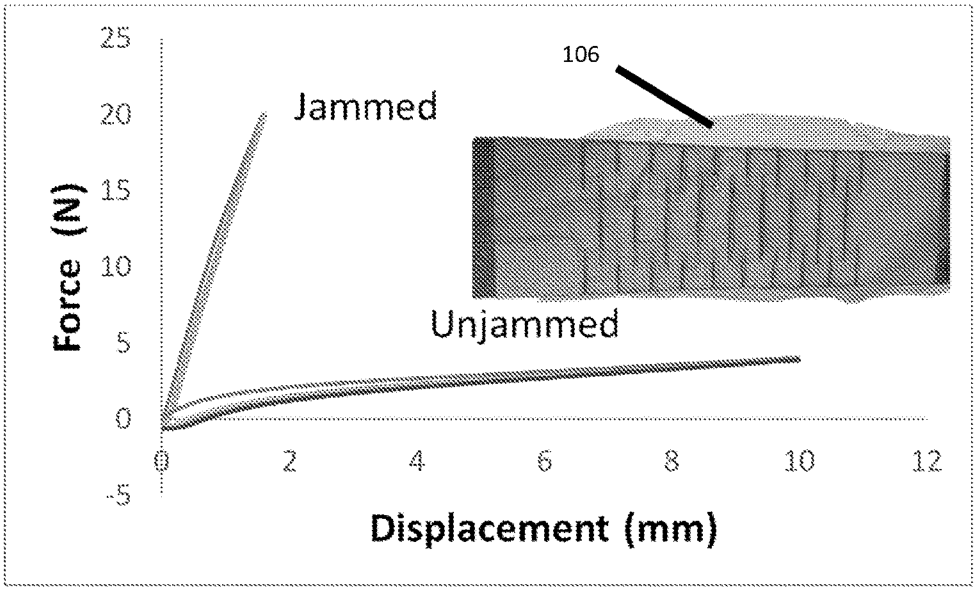

In some embodiments, the two or more sheets are jammed by pneumatic means. In some embodiments, the complete view of the actuator 101 having first sheet 102 and second sheet 104 enclosed in a sleeve or pouch 106 is shown in FIG. 1D. In some embodiments, the sleeve is connected to a vacuum source and the sleeve is under vacuum in the second, jammed state. Application of a vacuum results in negative pressure within the sleeve. Application of a vacuum to restrict out-of-plane motion can be seen in FIG. 1B, described above. As shown in FIG. 1H, the stiffness of the actuator increases when a vacuum is applied, and the actuator is in the jammed state, compared to the unjammed state. In these embodiments, the pneumatic actuator can be switched from the first state to the second state by applying a vacuum.

In certain embodiments, "sleeve" can refer to any enclosure into which the sheets can fit. In some embodiments, the sleeve is made from elastic or elastomeric material. In some embodiments, the sleeve is made from non-extensible material. In some embodiments, the sleeve is pleated. In some embodiments, the sleeve is made from an undulating, non-extensible material with some slack. In some embodiments, the sleeve is connected to a fluid inflation/vacuum source but otherwise air-tight and isolated from the atmosphere.

In some embodiments, the sleeve includes an extensible material. The extensible material can be thin and have a low modulus relative to the first and second sheet. Non-limiting examples of elastomeric materials include rubber, silicone, and polyurethane. In some embodiments, the sleeve does not contribute significantly to the stiffness of the actuator. As shown in FIG. 1G, the stiffness of an actuator with no sleeve is similar to the stiffness of an actuator with a sleeve, but no vacuum applied. In some embodiments, the stiffness of the sleeve is less than the stiffness of the stacked sheets, and the stiffness of the actuator can be modeled with the stiffness of the stacked sheets and the stiffness of the sleeve in parallel.

In some embodiments, the sleeve is folded or includes some slack. For example, the sleeve can have a bellows structure. In this embodiment, the sleeve need not include an extensible material.

In some embodiments, the sleeve is filled with a fluid. This fluid can alter the pressure within the sleeve and further restrict out-of-plane motion of the sheets. In some embodiments, the fluid is a non-Newtonian fluid. In certain embodiments, a "non-Newtonian fluid" can refer to any fluid with a viscosity that depends on the applied strain rate. For example, the viscosity of the fluid would be low if force is slowly applied to the actuator and high if the force is quickly applied to the actuator. In some embodiments, the fluid has a viscosity that is responsive to or tuned by an external stimulus. Non-limiting examples of external stimuli include heating, cooling, electric fields, magnetic fields, shear forces, vibrations, chemical reactions, pH level, exposure to light ranging from UV to IR, or combinations thereof. Non-limiting examples of responsive fluids include magnetorheological fluidics, electrorheological fluids, agarose in water, cornstarch in oil or water, silica particles in polyethylene glycol, Pluronic F127, Pluronic F68, azobenzene modified polymers and surfactants in water, and poly(N-isopropylacrylamide)-water solutions, including double network hydrogels. In some embodiments, the viscosity of mixtures of photopolymers with surfactants can change in response to light. In some embodiments, pure liquids, including water, can be responsive to external stimuli to effect a phase change from a liquid to a solid, which can lock the actuator in place.

B. Magnetic Jamming

Figure 2A:
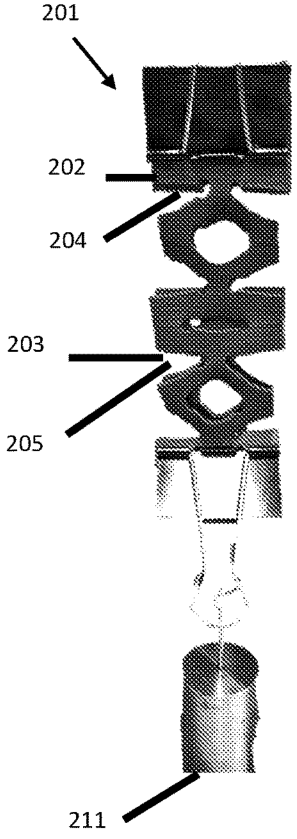
FIGS. 2A-2D show a magnetic actuator, according to some embodiments.
Figure 2B:
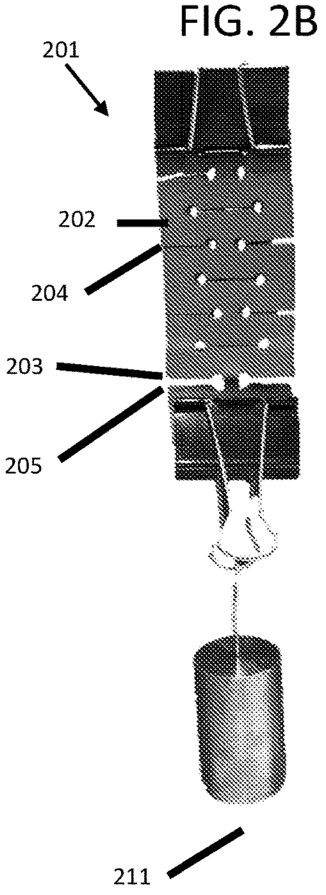
Figure 2C:
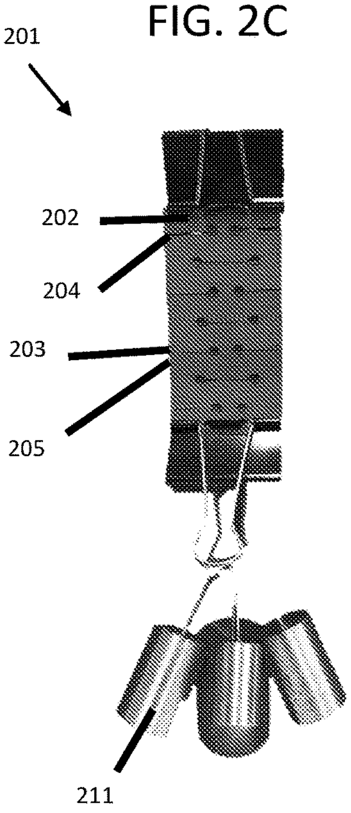
Figure 2D:
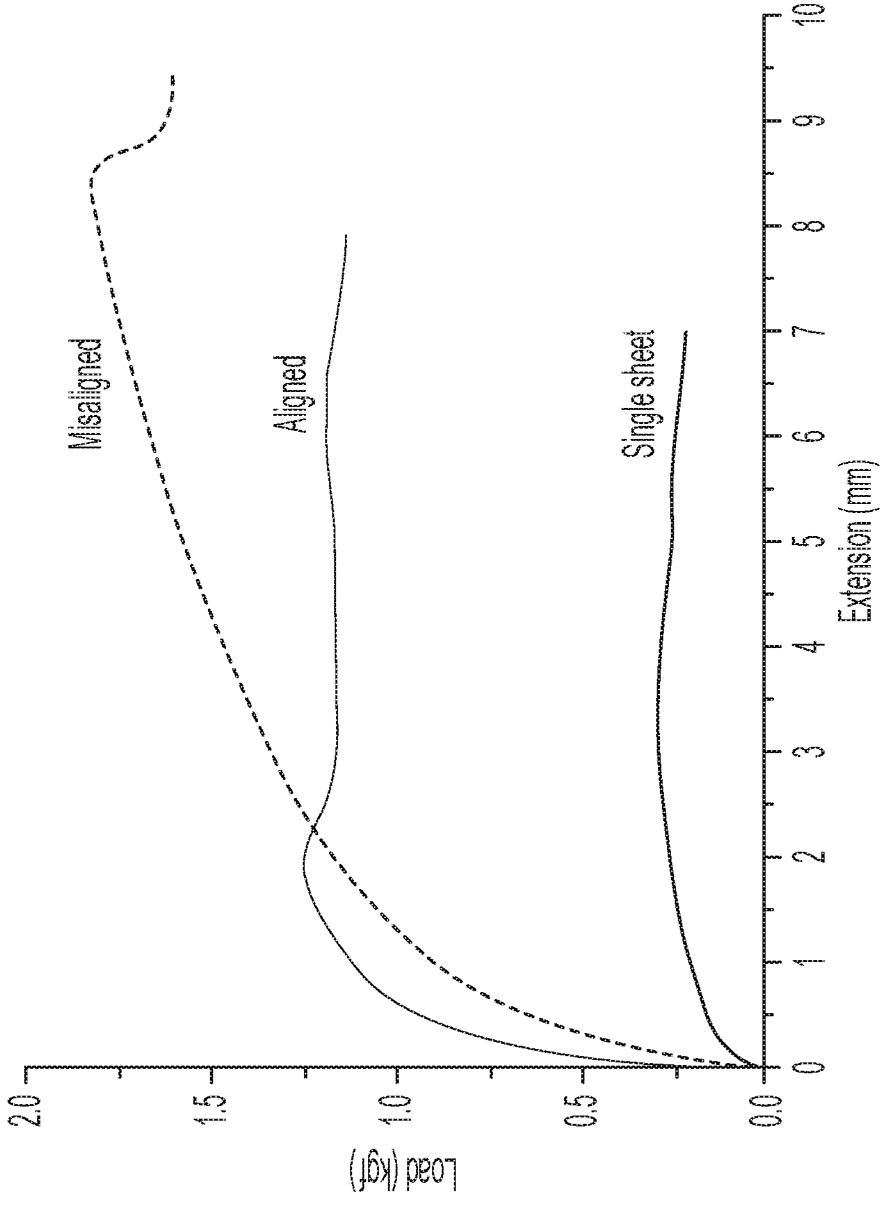

In some embodiments, two or more sheets are jammed by magnetic means. In some embodiments, the first sheet 202 and second sheet 204 are magnetically attracted to each other. An actuator 201 according to this embodiment is described with respect to FIGS. 2A, 2B, 2C, and 2D. In the embodiments shown in FIGS. 2A-2D, the magnetic actuator is fixed at one end and attached to a load 211 at the other end. In these embodiments, the actuators comprise a first magnetic sheet 202 with a plurality of parallel openings 203 and a second magnetic sheet 204 with a plurality of parallel openings 205. In this embodiment, each opening includes a circular portion at each end. FIG. 2A shows an actuator 201 where the magnetic surfaces of the first magnetic sheet 202 having a plurality of openings 203 and second magnetic sheet 204 having a plurality of openings 205 are facing away from each other. The first and second magnetic sheet are free to rotate out-of-plane, and the actuator can support only a single load 211. FIG. 2B shows an actuator 201 where the magnetic surfaces of the first magnetic sheet 202 and second magnetic sheet 204 are facing toward each other, but the first openings 203 and second openings 205 are aligned. The first and second magnetic sheet are free to rotate out-of-plane, and the actuator can support only a single load 211. FIG. 2C shows an actuator 201 where the magnetic surfaces of the first magnetic sheet 202 and second magnetic sheet 204 are facing toward each other, and the first openings 203 and second openings 205 are misaligned. The first and second magnetic sheet cannot rotate out-of-plane because of the magnetic force and misalignment, and the actuator can support multiple loads 211. As shown in FIG. 2D, the stiffness of the misaligned actuator 201 shown in FIG. 2C is greater than that of the aligned actuator 201 of FIG. 2B. The magnetic actuator can be switched from the first state to the second state by applying a magnetic field.

C. Electric Jamming

In some embodiments, the sheets are jammed by electric means. In these specific embodiments, each of the sheets includes a first and second conducting surface and an insulating material sandwiched between the first and second conducting surfaces. In this embodiment, each sheet acts as a parallel plate capacitor: the conductive surfaces act as the conducting plates and the insulating material acts as the dielectric. In some embodiments, each sheet is a laminate formed of a first layer of a conducting material, an interior layer of an insulating material, and a second layer of a conducting material. In other embodiments, each sheet includes an insulating material with a conducting coating disposed on each surface of the insulating sheet.

In some embodiments, the sheets are jammed by applying an electric field. When an electric field is applied, a positive charge accumulates on the first surface of the first sheet and a negative charge accumulates on the opposite surface. An opposite, positive charge will accumulate on the surface of the second sheet facing the second surface of the first sheet. Each sheet will be electrostatically attracted to the adjacent sheet, and this electrostatic force jams the misaligned openings from adjacent sheets together and restricts the out-of-plane motion of the actuator. The electric actuator can be switched from the first state to the second state by applying an electric field. In some embodiments, the electric field can be enhanced by introducing a dielectric liquid with a relative dielectric constant greater than 1. Non-limiting examples of dielectric materials include silicone oil, de-ionized water, vegetable oil, glycerol and combinations thereof.

In some embodiments, the electrically conductive surfaces can be patterned so that the sheets include regions that are jammed and regions that are not jammed. For example, patterning of thin electrodes with individually addressable areas of high voltage and ground can be done via lithography via wet or dry etching or lift-off processes, stencil patterning and deposition, inkjet printing, silk-screening, electrodeposition and/or any other processes known by those skilled in the art to pattern thin electrodes on insulating substrates. In some embodiments, the conductive layer is encapsulated in an electrical insulator. In some embodiments, patterned electrodes on an insulating kirigami sheet can create region(s) of high voltage within the actuator relative to other region(s) of the actuator. In some embodiments, patterned electrodes are used for electroadhesion. In some embodiments, one high voltage electrode is attached to one kirigami sheet and one grounded electrode is attached to an opposing kirigami sheet to achieve electrostatic actuation. In some embodiments, patterned electrodes can create regions with a voltage that can be switched on and off to switch jamming on and off, e.g., in one or more regions in a pre-determined or controlled fashion. In some specific embodiments, these pre-determined or controlled on and off switching can result in the controlled changes of the properties of one or more regions of the sheet, such as the changes of the viscosity of a dielectric liquid in the regions. In some embodiments, patterned electrodes on an insulating kirigami sheet include an array of electrodes. In some embodiments, patterned electrodes on an insulating kirigami sheet include an array of electrodes which can be switched on and off in a pre-determined fashion such that an object on the sheet (e.g., a liquid droplet responsive to the voltage change) can be manipulated (e.g., moved) in a pre-determined or controlled fashion.

D. Adhesive Jamming

In some embodiments, the sheets are jammed by adhesive means. In this embodiment, an adhesive is disposed on the surfaces of each of the adjacent sheets facing each other. Non-limiting examples of adhesives include pressure sensitive adhesives, mechanical adhesives, van der Waals based reversible adhesives, interlocking adhesives, switchable adhesives, tape, shape memory polymers, and combinations thereof. Non-limiting examples of mechanical adhesives include Velcro or hook-in-loop adhesives, interlocking mushroom type adhesives including, e.g., 3M Dual Lock reclosable fasteners. In some embodiments, for the Dual Lock type fasteners, a thin elastomer membrane or balloon type structure is included between the two adhesive sheets to provide storage of elastic energy to help unj am the composite once jamming forces are removed. In these embodiments, the unlocking of the locked sheets can be initiated with much lower forces once vacuum was removed. In some embodiments, the adhesive is a gecko-like adhesive. A gecko-like adhesive can include a stiff fabric (e.g., carbon fiber or Kevlar) and a soft elastomer (e.g., polyurethane or polydimethylsiloxane) for draping adhesion. In some embodiments, the adhesive is a shape memory polymer that changes shape, stiffness, or phase in response to an external stimulus.

In some embodiments, this adhesive is activated by a stimulus such that the misaligned sheets are free to rotate out-of-plane in the absence of the stimulus but unable to rotate out-of-plane in the presence of the stimulus. In some embodiments, the adhesive is active in the absence of a stimulus and released by application of the stimulus such that the misaligned sheets are unable to rotate out-of-plane in the absence of the stimulus but are free to rotate out-of-plane in the presence of the stimulus. Non-limiting examples of stimuli include heat, light, chemical stimuli, pressure, external forces, electrical fields, magnetic fields, and combinations thereof. Non-limiting examples of chemical stimuli include solvents and lubricants. In some embodiments, solvents can lead to swelling of the adhesive or changes in interfacial interactions between adhesives. Non-limiting examples of lubricants include oils, fluorinated oils, surfactants in water, alcohols, organic solvents, water, ionic liquids, low melting point waxes, glycerol, and polyethylene glycol. In some embodiments, the adhesive actuator can be switched from the first state to the second state by application of a stimulus.

Figure 3A:
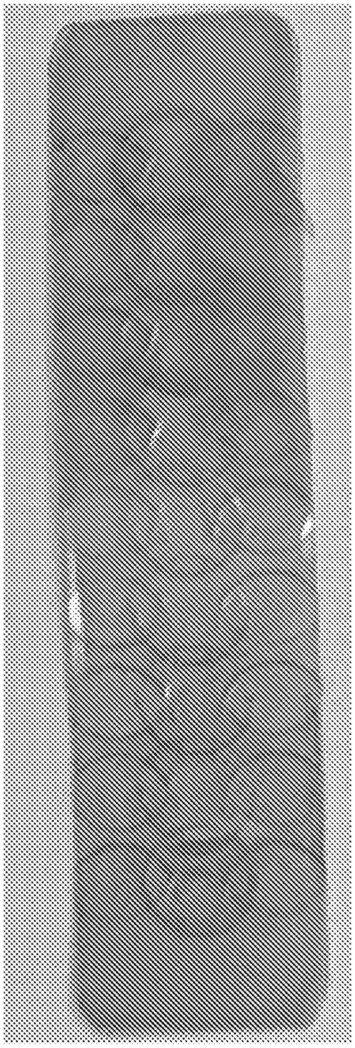
FIGS. 3A-3C show adhesive actuators, according to some embodiments.
Figure 3B:
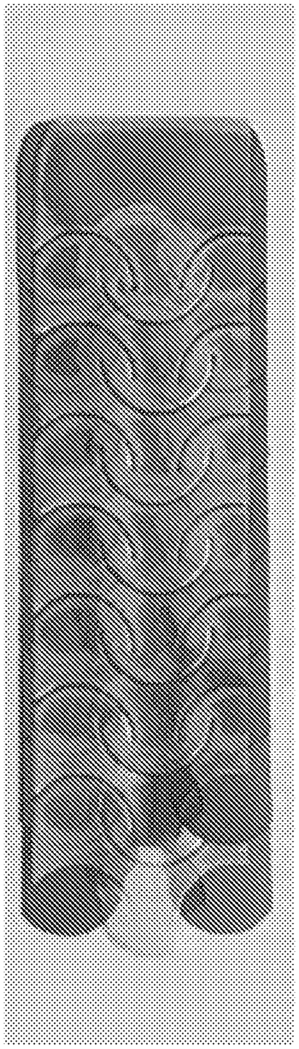
Figure 3C:
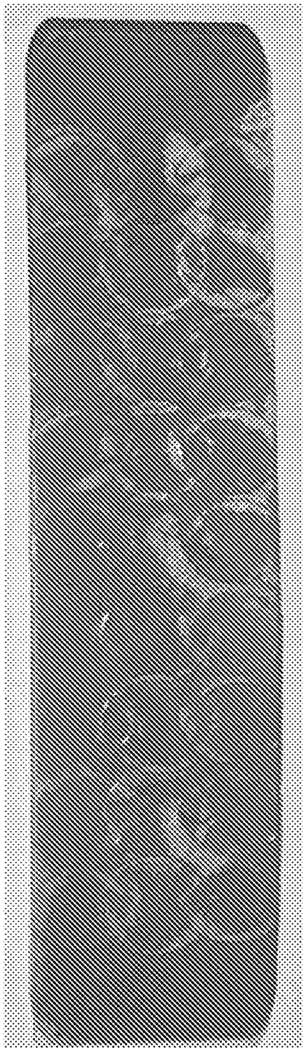

FIGS. 3A-3B shows exemplary actuators with adhesive jamming. FIG. 3A shows an actuator that includes two sheets made of Kapton tape (a polyimide film with a silicone adhesive). FIG. 3B shows an actuator that includes a sheet of Kapton tape and a sheet of polyester. FIG. 3C shows an actuator that includes a sheet of gecko adhesive and a sheet of polyester.

In some embodiments, the adhesive is a thermo-responsive adhesive. For example, thermo-responsive adhesive can include a shape-memory polymer that changes its properties at a particular temperature. For example, in one embodiment, a shape memory polymer can have a mushroom-like fiber. In this embodiment, the shape memory polymer is rigid at low temperatures and acts like an interlocking or Velcro-like adhesive that can adhere to a fabric. In this embodiment, the shape memory polymer is soft at high temperatures, and can adhere to a smooth surface using van der Waals forces.

III. Openings

In some embodiments, the length of each opening is greater than the width of each opening. In some embodiments, the openings have high aspect ratios. In some embodiment, the opening has dimensions such that its length is much greater, e.g., 100, 90, 80, 70, 60, 50, 40, 30, 20, 15, 10, 9, 8, 7, 6, 5, 4, 3, or 2 times greater, than its width; or the ratio of its length to its width is in a range bounded by any two values disclosed herein. In some embodiments, the opening width is variable along its length. In some embodiments, the opening with variable width along its length helps with designs of interlocking adhesives, as well as allowing for the ends of the cuts to be designed to be more robust against tearing or premature failure by having rounded/blunted ends. In some embodiments, the opening has a larger minimum diameter than its average width at its ends to minimize crack propagation and tearing when the opening is strained. In some embodiments, the opening includes circular regions at each end.

In some embodiments, the first and second sheets each include a plurality of regions that can be jammed or actuated independently. In some embodiments, the first sheet includes a first region including the first openings and a second region including a plurality of third openings. In some embodiments, the second sheet includes a first region including the second openings and a second region including a plurality of fourth openings. In some embodiments, the first and second sheet are stacked such that the first region of the first sheet overlaps spatially with the first region of the second sheet, and the second region of the first sheet overlaps spatially with the second region of the second sheet. In some embodiments within the first region, the first openings of the first sheet and the second openings of the second sheet are misaligned. In some embodiments, within the second region, the third openings of the first sheet and the fourth openings of the second sheet are misaligned. The first region and the second region can be jammed independently. In some embodiments, the actuator will have a first region and a second region with stiffness that can be controlled independently. In other embodiments, sequential jamming of a first region and a second region allows the actuator to have more than two states. In a first state, no regions are jammed. In a second state, the first region is jammed. In a third state, the second region is jammed. In a fourth state, the first and second regions are jammed. Each state can have a different stiffness.

In some embodiments, the openings or cuts of each sheet form a pattern. In some embodiments, the sheets are stacked so that the patterns of adjacent sheets are misaligned. The patterns can be regular or irregular. In some embodiments, the second sheet is stacked such that its openings are misaligned or offset from the openings of the first sheet by translation in the plane of the sheets. In some embodiments, the second sheet is stacked such that its openings are misaligned or offset from the openings of the first sheet by rotation in the plane of the sheets. When the sheets are misaligned and jammed, the beams or struts formed by the openings are not permitted to rotate out-of-plane.

In some embodiments, at least one of the patterns including the openings is oriented randomly. If the openings are oriented randomly, less care is needed to ensure that stacked, adjacent sheets are misaligned. It is unlikely that randomly oriented openings would be accidentally aligned. In embodiments where the openings are randomly oriented, the stiffness of the actuator can be less precisely controlled. However, an average stiffness can be estimated based on the lengths of the openings, the number of openings, and the spacing between the openings.

In some embodiments, the openings or the edges of the sheets are round. Round openings and edges are less likely to form sharp edges that would damage a sleeve used, for example, for pneumatic actuation.

In some embodiments, at least one of the patterns includes openings at angles to each other. In some embodiments, a pattern includes a plurality of openings oriented along a first axis and a plurality of openings oriented along a second axis.

In some embodiments, the pattern of adjacent sheets are similar or identical. In certain embodiments, "identical" can refer to two patterns having openings of exactly the same dimensions, orientations, spacing, and locations. In certain embodiments, "similar" can refer to two patterns having openings with at least one of the following properties in common: dimensions, orientations, spacing, and locations. Two patterns are similar, for example, if they include openings having the same type of openings, such openings having random or parallel orientations.

In other embodiments, the pattern of the first sheet and the pattern of the second sheet are different. In certain embodiments, "different" can refer to two patterns having openings with different dimensions, orientations, spacing, or locations. In some embodiments, two patterns are different because the first pattern includes openings oriented parallel to each other and the second pattern includes openings oriented randomly with respect to each other. In some embodiments, two patterns are different because the openings of the two patterns have different orientations. In some embodiments, two patterns are different because the openings of the first pattern are longer than the openings of the second pattern. In some embodiments, two patterns are different because a first pattern includes openings parallel to a first axis and the second pattern includes openings parallel to a second axis. In some embodiments, two patterns are different because the spacing between openings in the first pattern is greater than the spacing between openings in the second pattern.

In some embodiments, the pattern of openings of adjacent sheets form a Moiré interference pattern based on overlap of two different patterns. In some embodiments, a Moiré pattern can be used to create regions of the actuator with different stiffnesses. In some embodiments, the stiffness and shape of each region depends on the relative orientations of the sheets. For example, the Moiré pattern can change as a first sheet is rotated relative to a second sheet or as a first sheet is translated relative to a second sheet.

In some embodiments, the openings of adjacent sheets are misaligned by a rotational angle. In this embodiment, the patterns of the openings can be identical or similar, and a first sheet is rotated with respect to a second sheet such that the openings of the second sheet are misaligned with the openings of the first sheet by an angle. In some embodiments, the angle of misalignment is between about 5° and 90°. For example, the angle of misalignment can be about 5°, 10°, 15°, 20°, 25°, 30°, 35°, 40°, 45°, 50°, 55°, 60°, 65°, 70°, 75°, 85°, or 90°, or in a range bounded by any two values disclosed herein.

In some embodiments, the alignment or misalignment of the sheet is completed via a folding action of a single sheet patterned with a perforated or scored edge that self-aligns or misaligns openings (e.g., cuts) when the sheet is folded on that line. In some embodiments, after folding, the sheet may be further cut to completely separate the first and second sheets, or left intact with the perforated or scored edge providing an inextensible portion of the actuator.

A. Parallel Openings

Figure 11A:
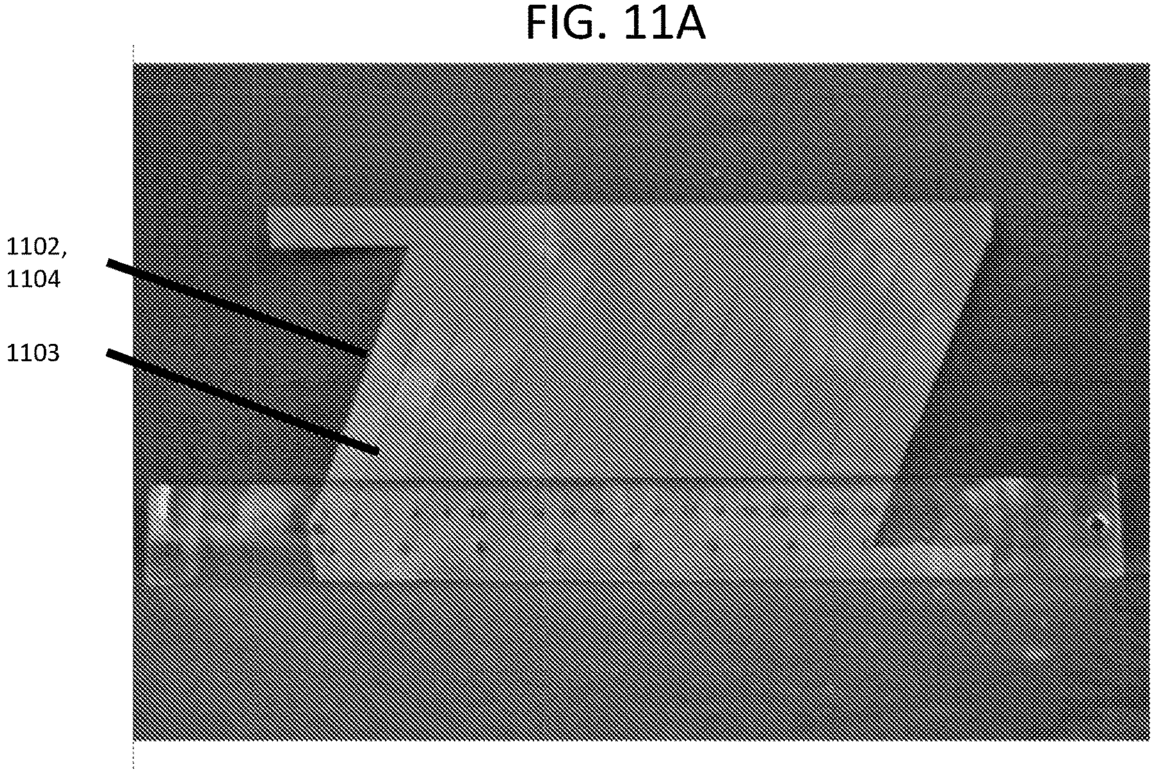
FIGS. 11A-G show an embodiment where the actuator is a McKibben actuator, according to some embodiments.

In some embodiments, at least one of the patterns includes openings oriented parallel to each other. In some embodiments, the parallel openings are oriented along an axis that is parallel to the axis of applied force. In other embodiments, the parallel openings are oriented along an axis that is perpendicular to the axis of applied force, as shown in FIG. 1D. In other embodiments, the parallel openings are oriented at an angle with the axis of applied force, as shown in FIG. 11A. In some embodiments, the spacing between parallel openings can be constant or vary across the sheet. In some embodiments, in actuators with parallel openings, the space between parallel openings can be modeled as a rectangular beam 107.

Figure 4:
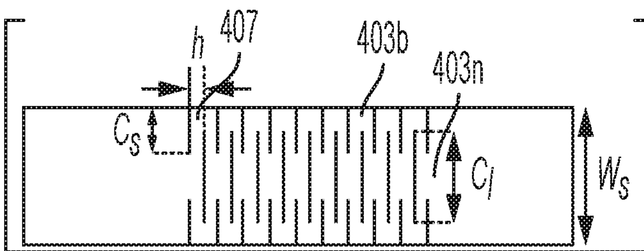
FIG. 4 shows the dimensions of the openings of a sheet with parallel openings, according to some embodiments.

In some embodiments, the pattern including openings parallel to each other is described with respect to FIG. 4. In these embodiments, the actuator has a width $w_s$, and the openings are oriented parallel to the long axis of the actuator. The pattern of openings alternates along the length of the actuator between two openings with length $c_s$ 403*a* extending from either side of the actuator and a single opening with length $c_l$ 403*a* at the center of the actuator. The spacing between the openings is h. The space between the parallel openings can be modeled as a rectangular beam 407 with width h.

Depending on the dimensions of the cut, the force/pressure required to keep the spring from buckling is very small in comparison to the load the spring can support in-plane. For a typical design of kirigami springs, the ratio of stiffness between in-plane and out-of-plane motion roughly scales with $(w/d)^2$ where w is the width of the spring elements formed by the openings and d is the thickness of the sheet. The actual ratio of stiff to soft compliance is more complex and depends on the specific cut pattern and boundary conditions, but for low aspect ratio ($w/d>10$) springs, it is evident that this stiffness ratio can be several orders of magnitude. The spring can switch from very stiff to very soft with a simple change of constraints, which is where jamming actuation can assist. There has not yet been a combination of jamming actuators and kirigami springs where jamming has been used to directly control the in-plane stiffness of kirigami springs. In one embodiment, a kirigami spring was manufactured of a rigid polymer and encased in an elastomer pouch or sleeve. A vacuum can be applied to restrict out-of-plane compliance. Depending on the mechanical properties and structure of the pouch and the kirigami, the resulting constrained kirigami can act as a shape memory metamaterial, a vacuum actuator with geometric advantage, or an on-off modulus switching material in one or two axes. The result is a composite material that can find wide use in a variety of applications and greatly expands the design space of jamming actuation techniques. While the current implementation is based on pneumatics, the constraining loading could come from magnetic or electrostatic forces without changing the basic design concept.

B. Periodic Arrays of Openings

In some embodiments, at least one of the patterns is periodic. In certain embodiments, "periodic" can refer a regular, repeating pattern of openings. A periodic pattern includes a unit cell of openings that are repeated at regular intervals with a constant pitch. In certain embodiments, the "pitch" can refer to the spacing between each unit cell. In some embodiments, two sheets can be misaligned by an offset pitch. If a second sheet is misaligned from a first sheet by an offset pitch, the second sheet is offset from the first sheet in translation within the plane of the sheets by a distance that is not equal to the pitch of the periodic pattern. If the two sheets are offset by a distance that is not equal to the pitch of the periodic pattern, the first sheet and second sheet will be misaligned, and out-of-plane rotation will be restricted when the actuator is jammed.

Figure 5A:
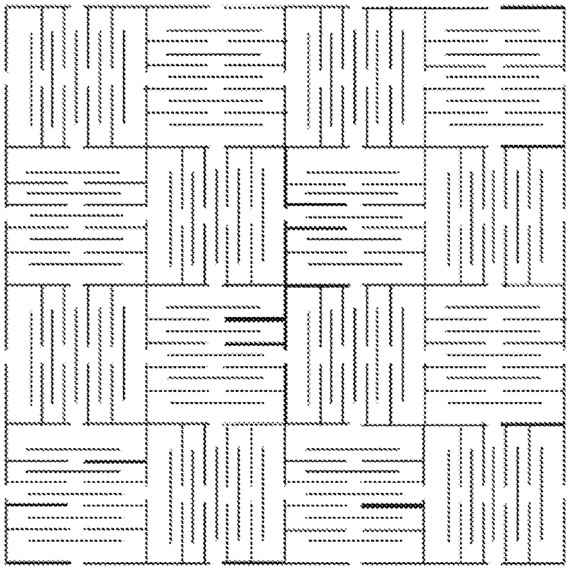
FIGS. 5A-5I show an embodiment of self-jamming kirigami sheets, according to some embodiments.
Figure 5A:
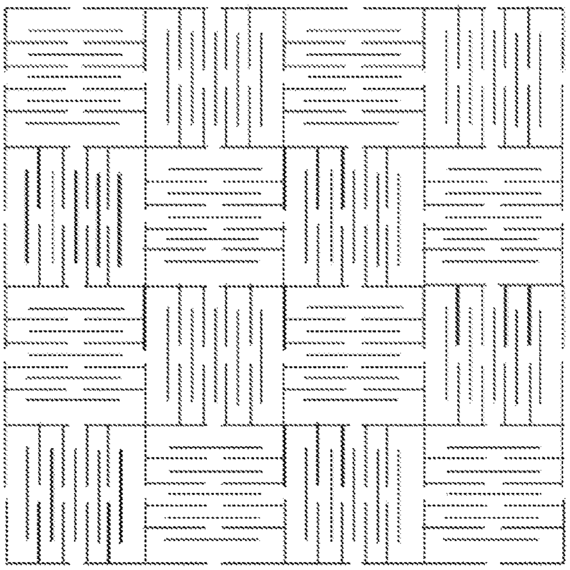
Figure 5B:
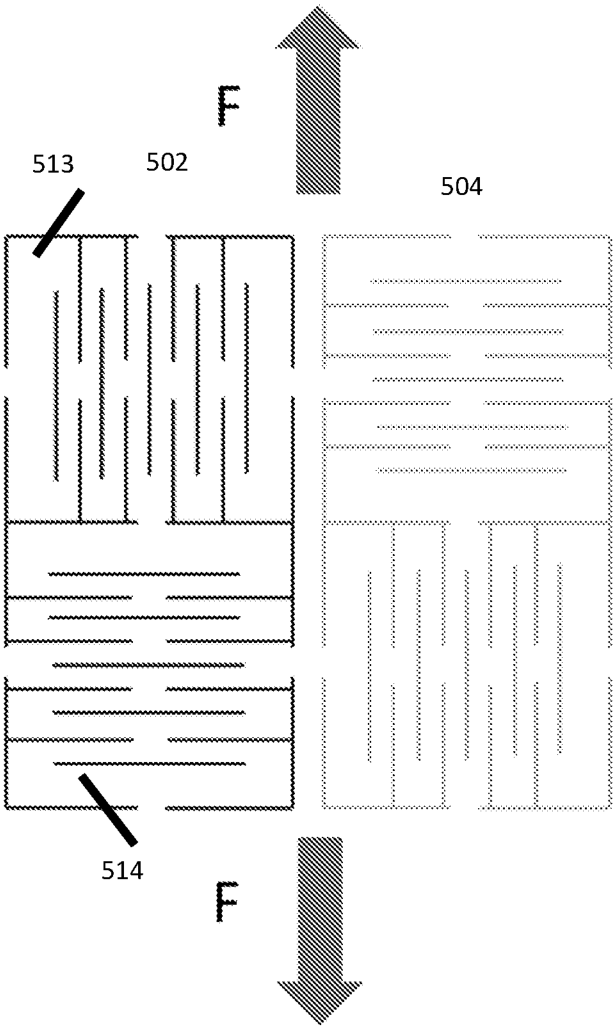
Figure 5C:
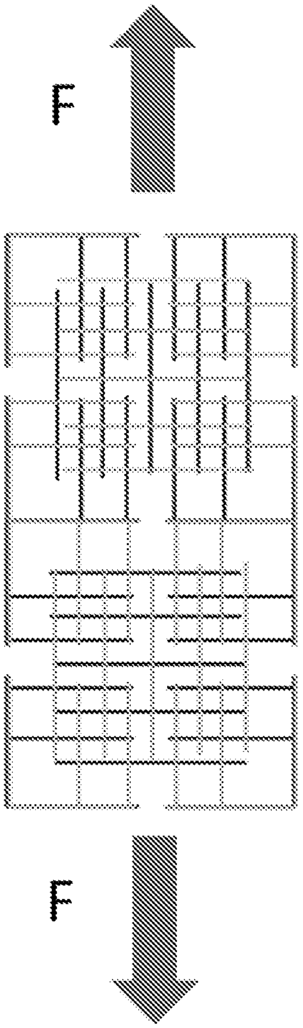

In some embodiments, at least one of the embodiments include a two-dimensional, periodic array of openings as seen in FIG. 5A. In this embodiment, as shown in FIG. 5B, the pattern includes alternating first regions 513 of openings parallel to a first axis and second regions 514 of openings parallel to a second axis, wherein the second axis is perpendicular to the first axis. In this embodiment, as shown in FIG. 5C, the first sheet 502 and the second sheet 504 can be stacked so that the first regions 513 of the first sheet 502 overlap with the second regions 514 of the second sheet 502, and the second regions 514 of the first sheet 502 overlap with the first regions 513 of the second sheet 504. In this embodiment, the first pattern of the first sheet is misaligned with the second pattern of the second sheet by an angle of 90°, and the out-of-plane motion is restricted when the actuator is jammed.

C. Interlocking Openings

Figure 6:
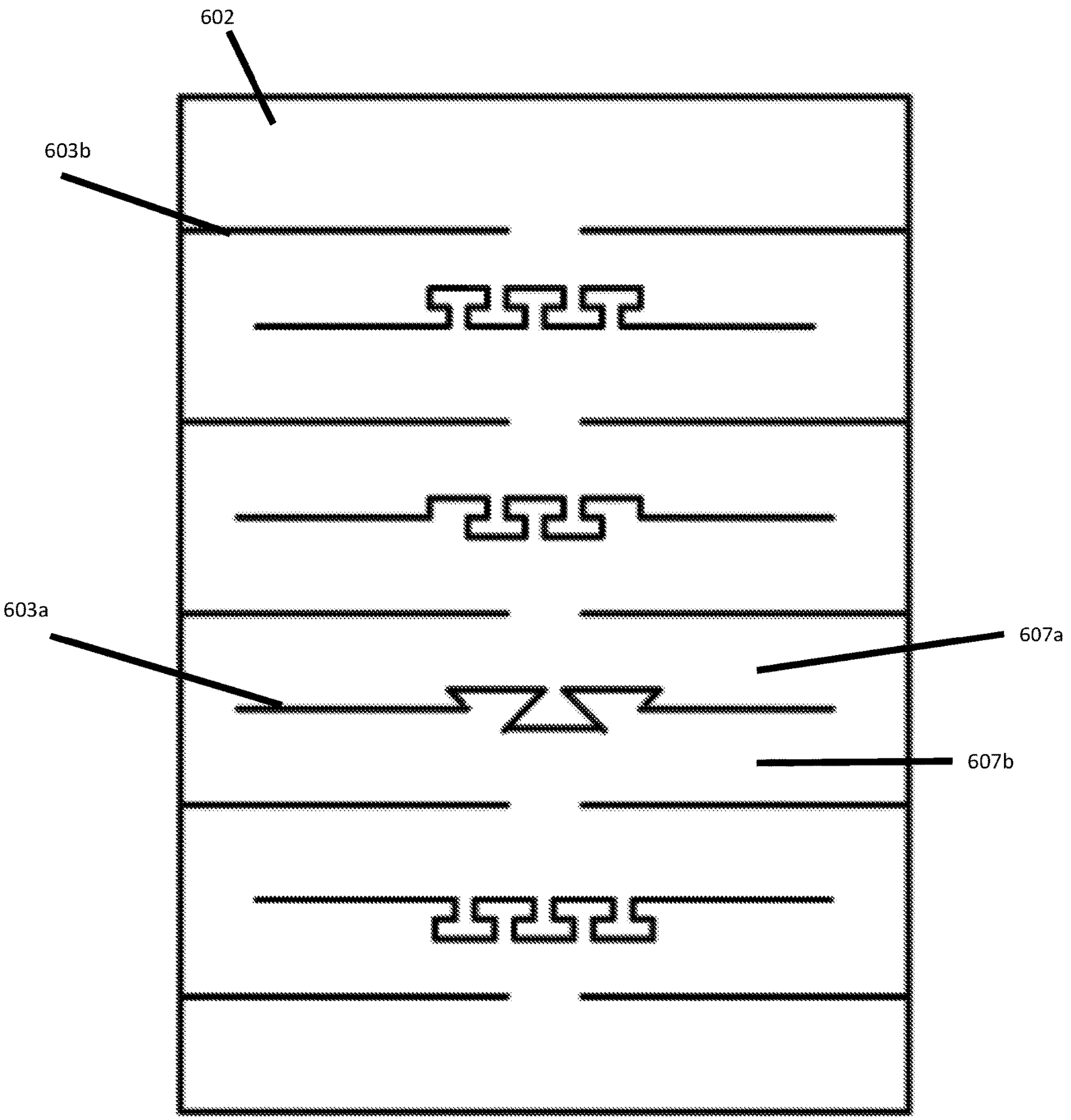
FIG. 6 shows a sheet with interlocking openings, according to some embodiments.

In some embodiments, shown in FIG. 6, the sheets 602 include interlocking openings 603*a*. In this embodiment, the actuator can form re-entrant or interlocking structures. An interlocking opening is one that restricts opening when the actuator is pulled in the axial direction. In some embodiments, the width of the interlocking openings 603*a* is small enough that the beams 607*a*, 607*b*, rotate out-of-plane before engaging with each other. In some embodiments, a sheet can include a combination of interlocking openings 603*a* and non-interlocking openings 603*b*. The sheets can include interlocking opening 603*a* at one or more locations.

When sheets 602 with interlocking openings are unjammed, a beam 607*a* will rotate out of plane before engaging with the adjacent beam 607*b*, and the actuator can extend axially. In some embodiments, the interlocking openings 603*a* will extend less than non-interlocking openings 603*b*, creating a limit on axial extension in the unjammed state. In this embodiments, the interlocking openings can prevent rolling of the sheets about the axis of extension when a load is applied. When sheets with interlocking openings are jammed, the beams 607*a*, 607*b* cannot rotate out-of-plane. Instead, a beam 607*a* will engage with the adjacent beam 607*b*, preventing axial extension. In some embodiments, interlocking openings 603*a* prevent further extension of the composite past a minimum engagement strain and allow for high maximum loads before plastic deformation.

In the embodiments shown in FIG. 6, the interlocking openings 603*b* have a zipper-like profile that includes both vertical and horizontal regions. In other embodiments, the interlocking openings 603*b* can have a trapezoidal profile. However, an interlocking opening can have any re-entrant or zipper-like geometry or any geometry that restricts opening when a load is applied in the axial direction. In some embodiments, the interlocking portion of the sheet may be thicker than the majority of the sheet to provide extra load-bearing capacity. In some embodiments of interlocking features, sharp corners are avoided which could initiate tears or fractures with repeated use. In some embodiments, the re-entrant profile openings (e.g., cuts) are present on all, some or one opening (e.g., cut) design on the sheet and may have all the same design, or have variable designs on a single sheet.

D. Curved Openings

Figures 7A, 7B:
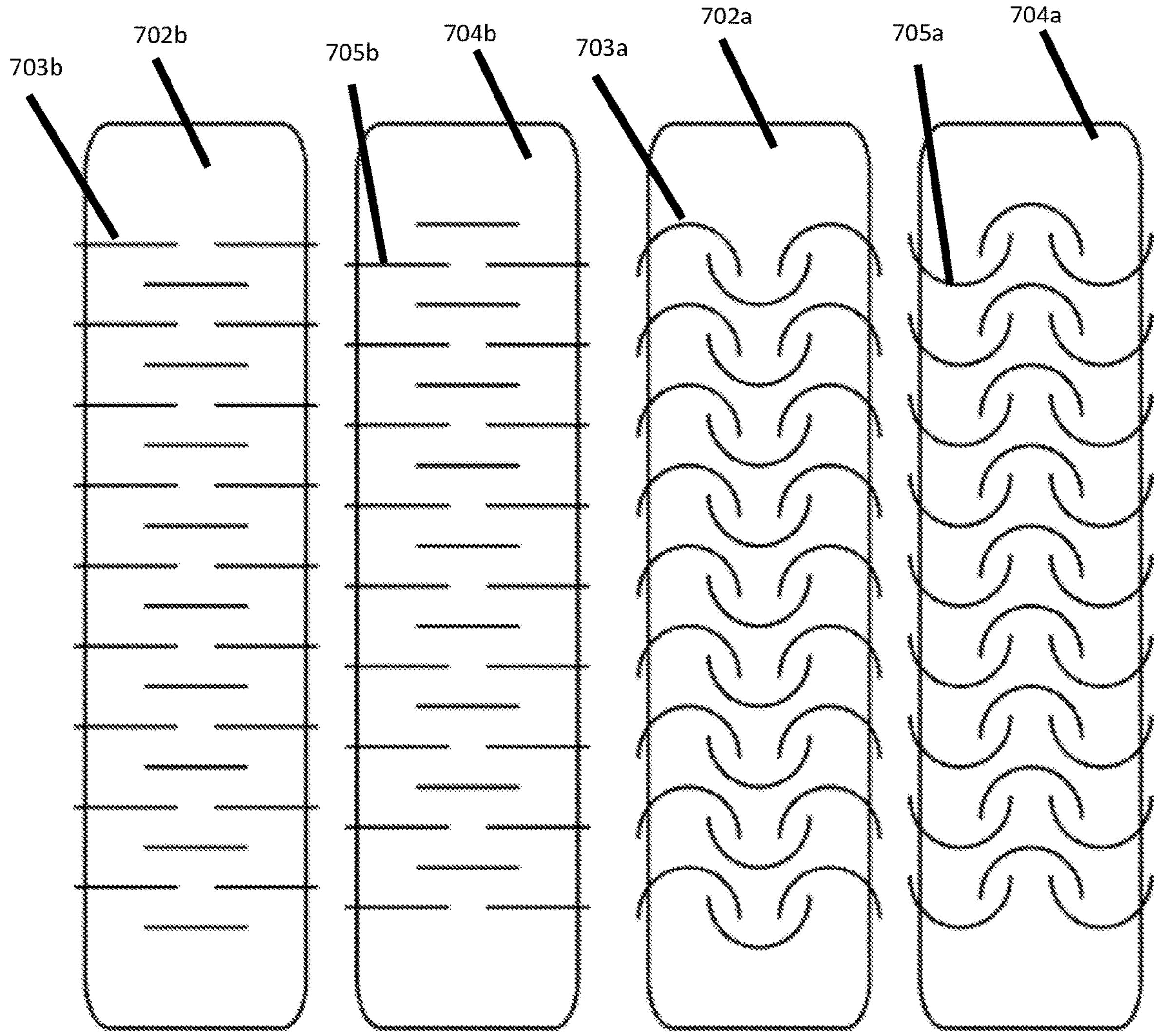
FIGS. 7A-7D shows sheets with curved openings, according to some embodiments.

In some embodiments, the openings are curved. As shown in FIGS. 7A-7B, sheets 702*a*, 704*a* with curved openings 703*a*, 705*a*, can have the same number of openings per length and absolute width, compared to sheets 702*b*, 704*b* with parallel openings 703*b*, 705*b*. However the length of the curved openings 703*a*, 705*b* is greater, while the portion with maximum bending is thinner. In some embodiments, the portion of maximum bending in this design is at the locations where the spring element is thinnest due to the axial loading conditions in this design. In some embodiments, an actuator with curved openings 703*a*, 705*a*, has a lower axial stiffness when unjammed, compared to an actuator with parallel openings 703*b*, 705*b*, because the ability to rotate out-plane is higher after buckling. In some embodiments, an actuator with curved openings 703*a*, 705*a*, has a higher axial stiffness when jammed, compared to an actuator with parallel openings, 703*b*, 705*b*, because the openings are partly aligned with an axial load and therefore will have less opening due to an axial load. Non-limiting examples of curved openings include triangular openings, semi-circular openings, rectangular openings, parabolic openings, sinusoidal openings, trapezoidal openings, and half-oval openings.

In some embodiments, shown, in FIGS. 7A-7B, the openings are semi-circular. FIG. 7B shows a first sheet 702*a* with a plurality of first semi-circular openings 703*a* and a second sheet 704*a* with a plurality of second semi-circular openings 705*a*. In some embodiments, the orientation of the semi-circular openings 703*a* of the first sheet 702*a* is opposite the orientation of the semi-circular openings 705*a* of the second sheet 704*a*.

Figure 7C:
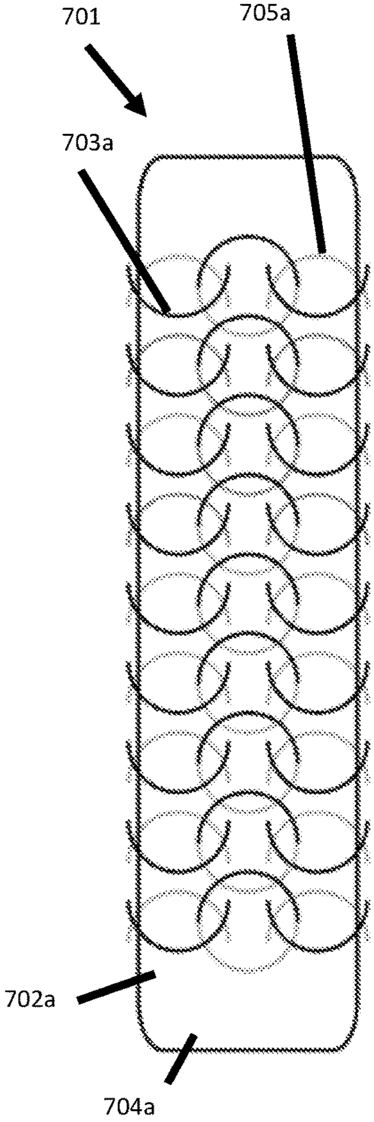
Figure 7D:
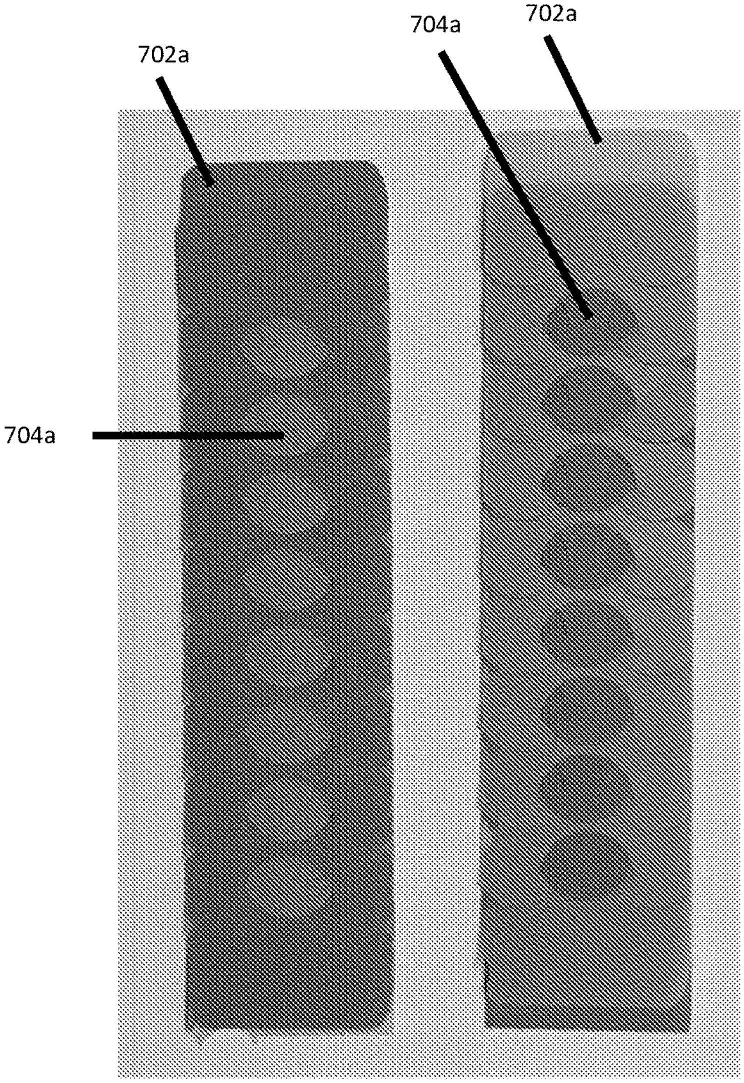

In some embodiments, shown in FIGS. 7C-7D, the curved openings 703*b*, 705*b* of the sheets 702*b*, 704*b*, can be inserted into each other. In this embodiment, sheets can be partially interlocked by jamming. In some embodiments, shown in FIG. 7D, a first sheet 702*b* with a first color can be inserted into a second sheet 704*b* with a second color. In this embodiment, the color of the actuator 701 can change as a load is applied. In this embodiment, the IR appearance of the actuator can change, which can be used for military camouflage or cooling of a spacecraft if the sleeve is transparent or no sleeve is used. In some embodiments, when the actuator is in the position on the left, more of the dark sheet is exposed, and the actuator has a darker color. When the actuator is in the position on the left, more of the light sheet is exposed, and the actuator has a lighter color.

E. Scored Patterns

Figure 8:
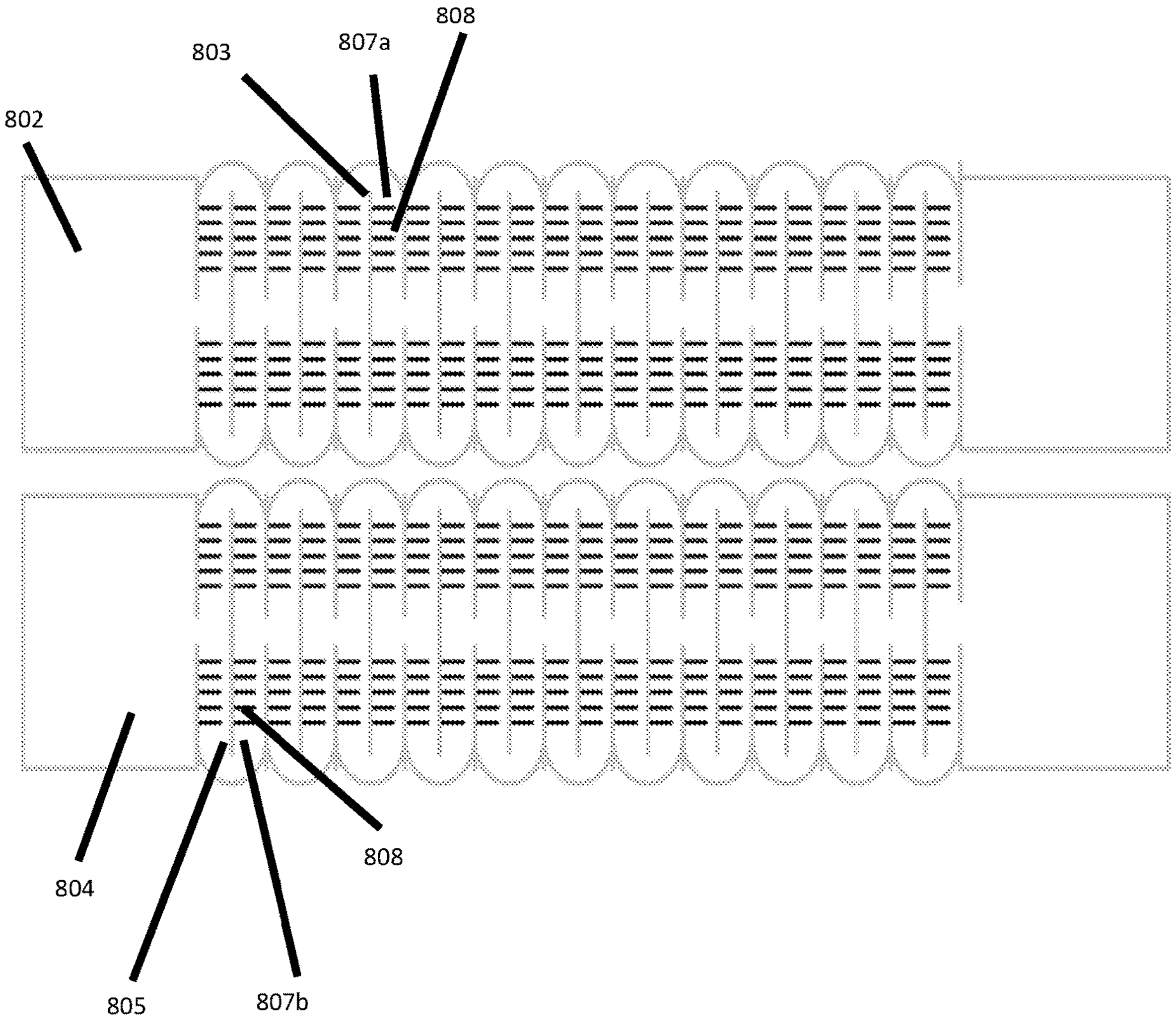
FIG. 8 shows two sheets with scoring, according to some embodiments, according to some embodiments.

In some embodiments, shown in FIG. 8, the sheets 802, 804 include scoring 808 or partial cuts oriented perpendicular to the openings 803, 805. In these embodiments, the scoring ensures that the beams 807*a*, 807*b* rotate in the desired direction. In some embodiments, the location, amount, and depth of scoring determines the direction of rotation. In the absence of scoring, the beams 807*a*, 807*b* can rotate in a random direction. Alternatively, the sheets can be pre-deformed or pre-buckled in the desired direction.

IV. Tube Actuators

Figure 9A:
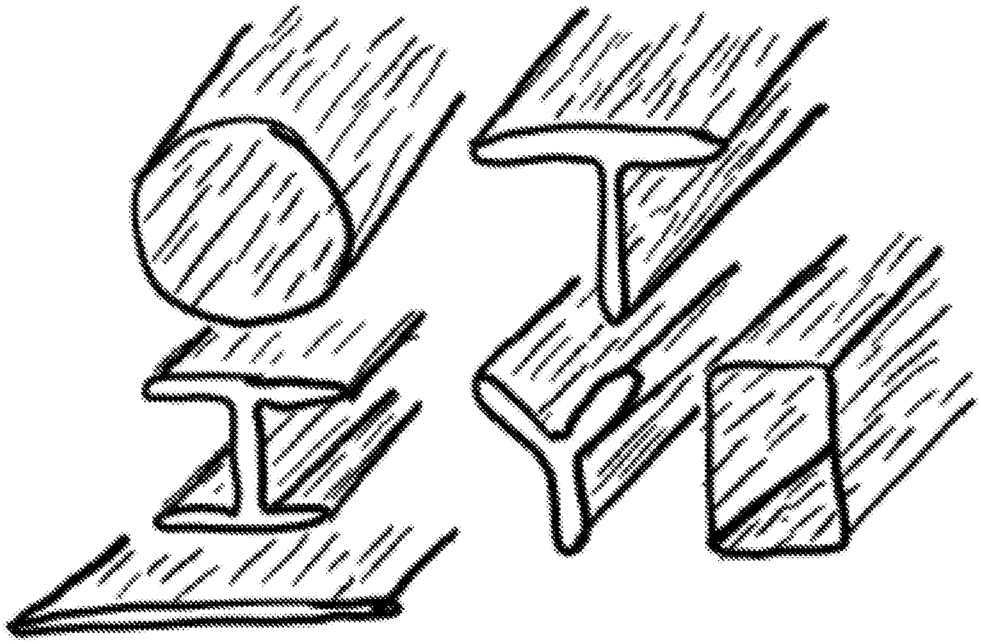
FIGS. 9A-9D show tube actuators, according to some embodiments.
Figure 9B:
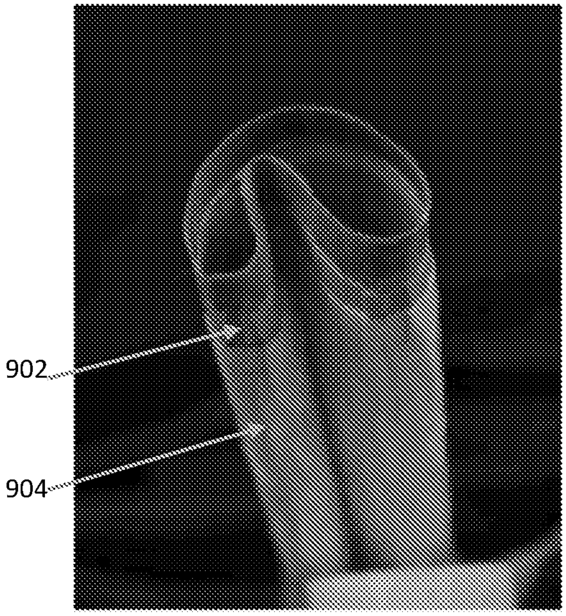
Figure 9C:
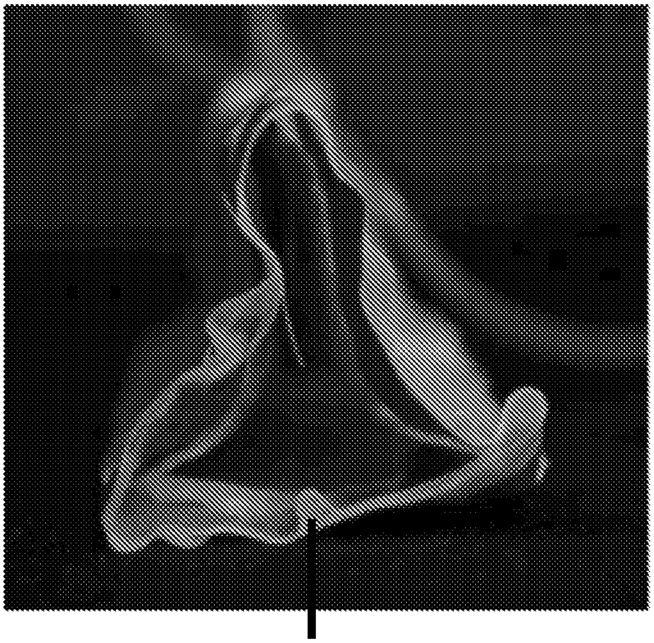

In some embodiments, the first and second sheets (902 and 904) are stacked together and enclosed in a sleeve 906, then shaped into an actuator with a tube shape as shown in FIG. 9A, FIG. 9B, and FIG. 9C. In some embodiments, the tube is formed by stacking sheets and then rolling in a spiral. In other embodiments, the tube is formed by cutting openings in tubes of different diameters and placing a tube with a smaller radius inside a tube with a larger radius.

Figure 9D:
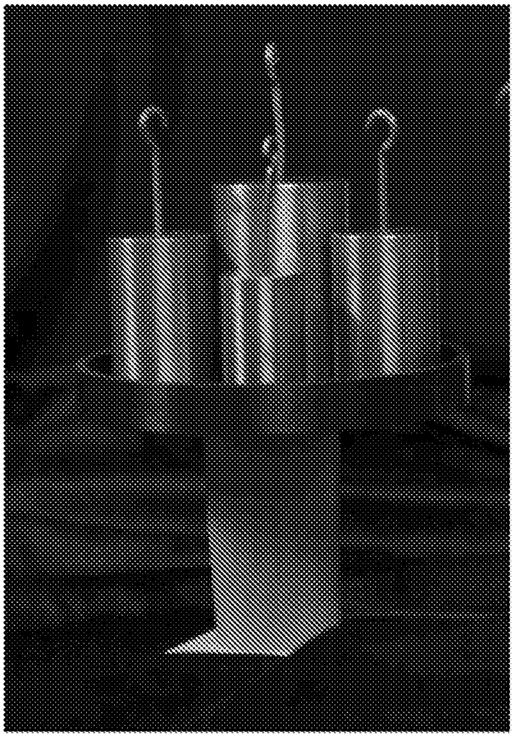

In some embodiments, the tube is stiffer in the second state than in the first state. When in the second, jammed state, the tube can be able to support a load along its axis, as shown in FIG. 9D. In this embodiment, the first and second patterns can be selected such that the tube is flexible radially but stiff axially. In some embodiments, the opening patterns are selected such that the openings are aligned with the axis of the tube, resulting in a higher compliance around the circumference than in the axial direction of the tube. In some embodiments, the tube can be deformed to have a different cross-section, while maintaining the same perimeter, and jammed to maintain that cross-section. In other embodiments, the tube can be deformed to have a different cross-section, while changing the perimeter, and jammed to maintain that cross-section. Different cross-sections have different area moments of inertia. Since the axial and bending stiffness depend on the area moment of inertia, the stiffness of the beam can be varied according to the cross-sectional area and shape. Non-limiting examples of cross-sections are shown in FIGS. 9A, 9B, and 9C, including circular, T-shaped, I-shaped, Y-shaped, rectangular, high aspect ratio rectangular, U-shaped, or triangular. For any of the exemplary cross-sections, the dimensions can be varied to achieve a different area moment of inertia and control bending stiffness. For, example, a rectangular cross-section can be square, with its length equal to its width, or a rectangle having a length much greater than its width, as in the high aspect ratio rectangular cross-section. FIGS. 9B-9C show tube actuators formed by a first sheet 902 and a second sheet 904 and enclosed in sleeve 906. FIG. 9B shows a tube actuator formed into a U-shaped cross-section. FIG. 9C shows a tube actuator formed into a triangular cross-section.

In some embodiments, the tube can be jammed to change its perimeter length and shape. In this embodiment, the tube can be expanded perpendicular to its long axis to increase its perimeter, then jammed to prevent additional change in the perimeter. In some embodiments, the interior can be jammed in addition by applying a vacuum to the interior to the tube. In this embodiment, the tube is double jammed: first jammed to define the cross-section of the tube, the jammed to maintain that cross-section.

In some embodiments, a method of changing the cross-section is shown in FIGS. 10A-10B of an actuator 1001. As shown in FIG. 10A, a ball 1015 can be inserted into the first end of a tube 1016 formed by a first sheet 1002 and a second sheet 1004 such that the ball expands the cross-section of the first end of the tube 1016 such that its perimeter is greater than the perimeter of the cross-section of the second end of the tube 1017. The tube is jammed to increase the stiffness. As shown in FIG. 10B, the actuator maintains the expanded cross-section after the ball is removed as long as jamming is maintained. In this way the cross-section of a tube can be reversibly modified.

In some embodiments, the tube-shaped actuator further includes a balloon disposed within the tube formed by a first sheet and a second sheet. Inflation of the balloon further constrains the out-of-plane motion of the kirigami sheets to increase the stiffness of the second state.

Figure 11B:
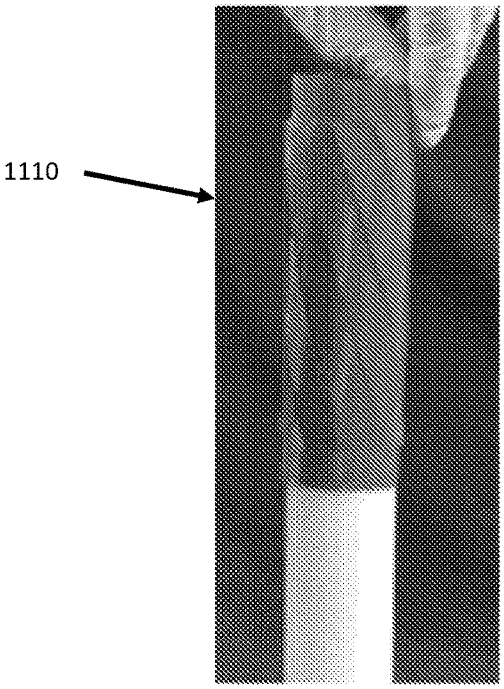
Figure 11C:
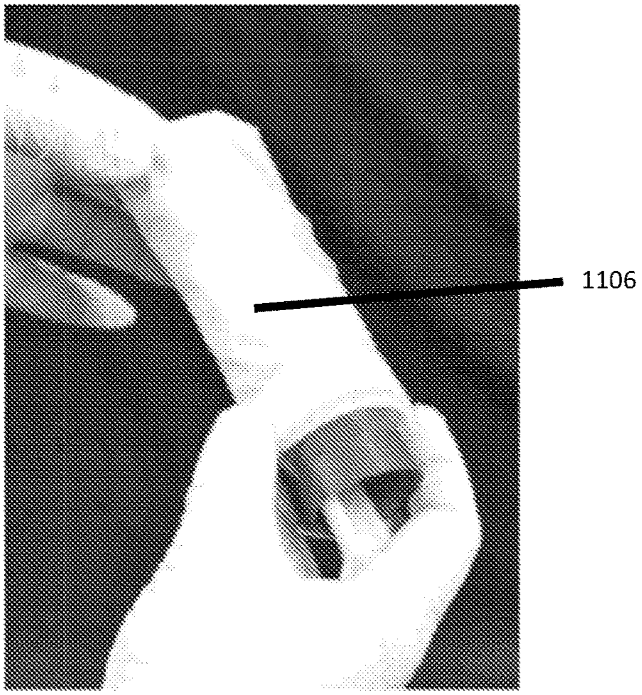
Figure 11D:
Figure 11E:
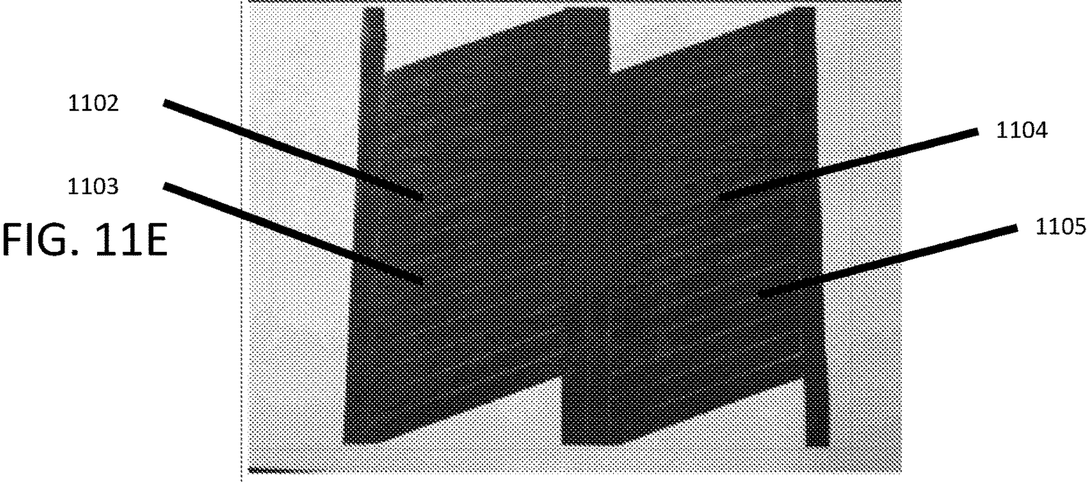
Figures 11F, 11G:
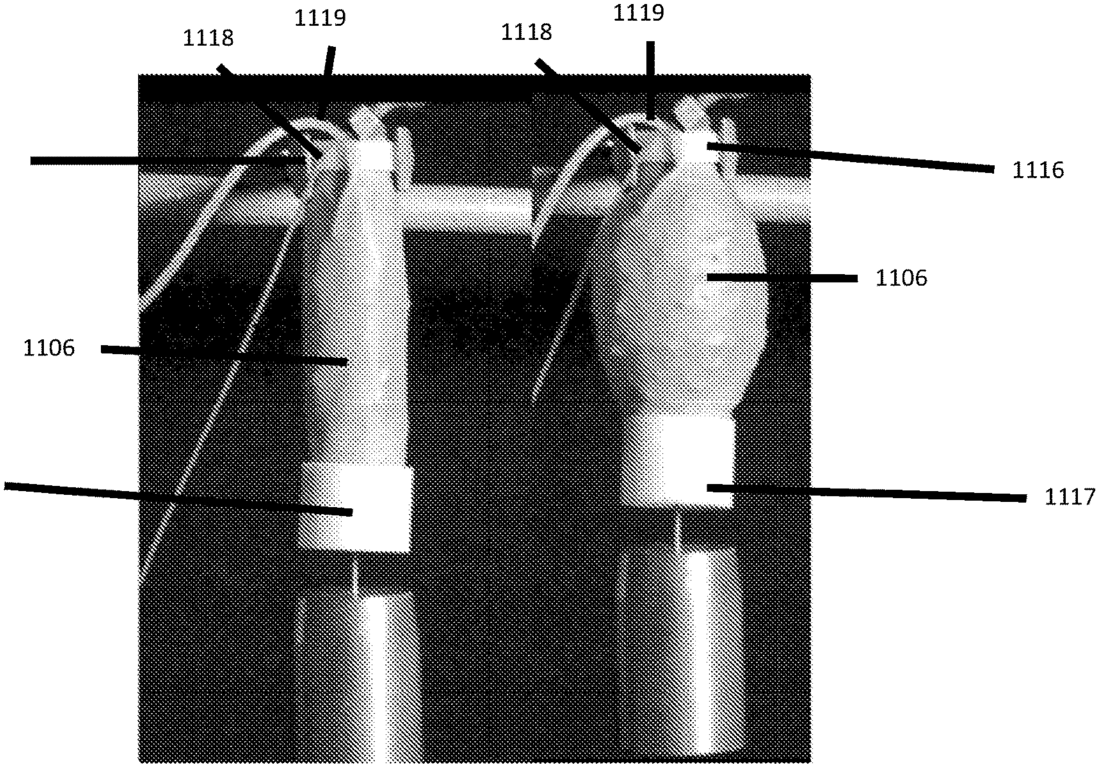

In some embodiments, radial expansion of the tube is permitted in the first state and radial expansion is constrained in the second state. An actuator according to this embodiment is described with respect to FIGS. 11A-11G. The actuator includes a plurality of sheets 1102, 1104 including openings 1103, 1105 parallel to each other and at an angle with respect to the long axis of the tube, as shown in FIG. 11A. In some embodiments, the actuator includes two sheets, as shown FIG. 11E. In some embodiments, the sheets are stacked together and rolled or shaped into an actuator with a tube shape 1110, as shown in FIG. 11B. The tube is then enclosed in a sleeve 1106, as shown in FIG. 11C. The tube can be capped with end pieces 1116, 1117 as shown in FIG. 11D to form an enclosed tube. This actuator functions as a McKibben actuator, as shown in FIGS. 11F and 11G. A "McKibben actuator" as use herein refers to a tube-shaped actuator that expands or contracts based on pneumatic actuation. In some embodiments, the interior of the tube can be pressurized by a balloon disposed within the tube or by fluid inlet. In this embodiment, a first inlet 1118 is connected to a vacuum source for the purpose of jamming the sheets, and a second inlet 1119 is connected to a fluid source for the purpose of pressurizing the interior of the tube or a balloon disposed within the tube. In the first, unjammed, state, the sheets are free to rotate out-of-plane and radial expansion of the tube is permitted, as shown in FIG. 11G. When the tube expands radially, the tube contracts along its length. In the second, jammed state, the plurality of the sheets cannot rotate out-of-plane and expansion is not permitted, as shown in FIG. 11F. The tube functions as a stiff beam in the second state.

V. Methods of Actuation

In another aspect, a method of actuation includes providing an actuator as described above and actuating the actuator from the first state to the second state.

As explained above, in some embodiments, the method of actuating the actuator from the first state to the second state is pneumatic. In this embodiment, the first sheet 102 and second sheet 104 are enclosed in a sleeve or pouch 106. See, e.g., FIG. 1D. In some embodiments, the sleeve is connected to a vacuum by an inlet or tube. In some embodiments, the sleeve is not under vacuum in the first, unjammed state, and the sleeve is under vacuum in the second, jammed state. In some embodiments, actuating the actuator includes applying a vacuum to the interior of the sleeve. Application of a vacuum to restrict out-of-plane motion can be seen in FIG. 1B. In other embodiments, actuating the actuator includes applying a pressure to the exterior of the sleeve. Alternatively, pressure can be applied to the exterior of the sleeve, for example, by inflating a balloon disposed within a tube-shaped actuator.

In some embodiments, the method of actuating the actuator from the first state to the second state is magnetic. See, e.g., FIGS. 2A-2D described above. In this embodiment, actuating the actuator includes applying a magnetic field. In some embodiments, the magnetic field is between 50 and 5000 gauss and higher fields providing higher jamming force. The magnetic field can be 50 G, 100 G, 200 G, 300 G, 400 G, 500 G, 1000 G, 1500 G, 2000 G, 2500 G, 3000 G, 3500 G, 4000 G, 4500 G, or in a range bounded by any two values disclosed herein.

In some embodiments, the method of actuating the actuator from the first state to the second state is electric. In this embodiment each of the first and second sheets includes a first and second conducting surfaces and an insulating material sandwiched between the first and second conducting surfaces. In some embodiments, actuating the actuator includes applying an electric field. When an electric field is applied, a positive charge accumulates on the first surface of the first sheet and a negative charge accumulates on the second surface. An opposite, positive charge will accumulate on the surface of the second sheet facing the second surface of the first sheet. Each sheet will be electrostatically attracted to the adjacent sheet, and this electrostatic force will restrict out-of-plane motion. In other embodiments, actuating the actuator includes introducing a dielectric liquid with a high dielectric constant.

In some embodiments, the method of actuating the actuator from the first state to the second state is adhesive. In this embodiment, an adhesive is disposed on the surfaces of each of the sheets facing each other. In this embodiment, actuating the actuator includes applying a stimulus to adhere the sheets together. Non-limiting examples of stimuli include heat, light, chemical stimuli, pressure, external forces, electrical fields, magnetic fields, and combinations thereof. In some embodiments adhesive actuation can be reversible or switchable such that the adhesive adheres strongly but can be easily released by a stimulus. In some embodiments, the actuator is unjammed in the absence of a stimulus and jammed by the application of a stimulus. In some embodiments, the actuator is a jammed in the absence of stimulus and unjammed by the application of a stimulus. In some embodiments, the actuator can be jammed by application of a first stimulus and unjammed by application of a second stimulus. In some embodiments, the actuator can be jammed by application of a first stimulus and unjammed by removal of the second stimulus.

Figure 12A:
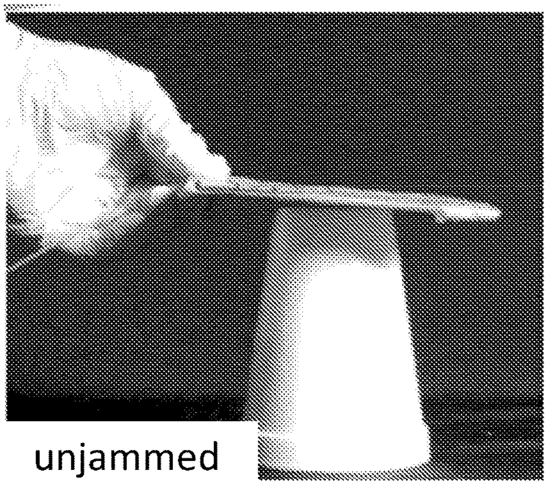
FIGS. 12A-12E show a sequence demonstrating the shape memory effect, according to some embodiments.
Figure 12B:
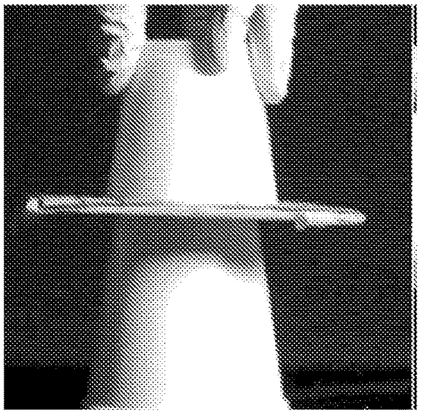
Figure 12C:
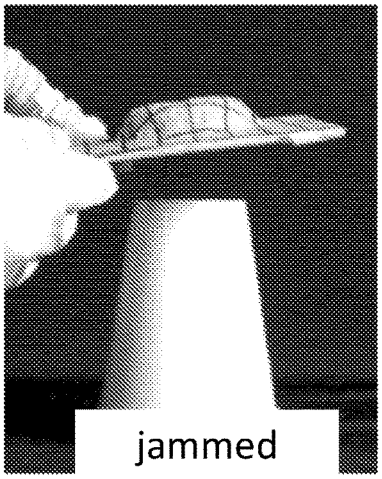
Figure 12D:
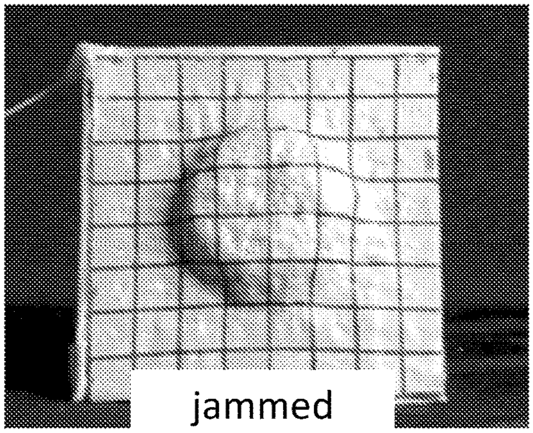
Figure 12E:
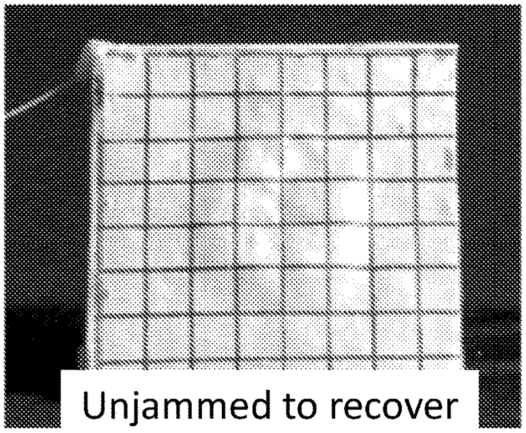

In some embodiments, the method of actuating the actuator further includes a method for reversibly changing the shape of the actuator or deforming the actuator. An actuator according to this embodiment of the invention is described with respect to FIGS. 12A-12E. In this embodiment, a deformation is applied to the actuator while in the first state, as shown in FIG. 12A. The actuator is then actuated from the first state to the second state, as shown in FIG. 12B, and maintained in the second state to maintain the deformation, as shown in FIGS. 12C and 12D. For example, two-dimensional actuator can be pressed against an object and jammed so that the actuator takes the shape of the object. For example, in FIGS. 12C-12D, the deformation takes the form of a raised circle. The actuator is then returned to the first state to remove the deformation, as shown in FIG. 12E. This method provides a mechanism for reversibly changing the shape of the actuator. For example, this method can be used to change the cross-section of tube-shaped actuator, as shown in FIGS. 9A, 9B, and 9C.

VI. Methods of Making an Actuator

In yet another aspect, a method of making the actuator is described, including providing a plurality of sheets, creating a plurality of openings each first sheet, each opening having a high aspect ratio, and stacking sheets such that a portion of the openings of adjacent sheets are misaligned. In one embodiment, a method of making the actuator is described, including providing a first sheet, creating a plurality of first openings in the first sheet each having a high aspect ratio, providing a second sheet, creating a plurality of second openings in the second sheet each having a high aspect ratio, and stacking the first and second sheets such that a portion of the first and second openings are misaligned.

In some embodiments, a method of making the actuator further is described, including disposing the sheets within a sleeve.

In some embodiments, the plurality of openings are created by a method selected from the group consisting of laser cutting, perforating, punching, water jet cutting, milling, lithographic patterning, soft lithographic patterning, casting, molding, dry etching, wet chemical etching, deep reactive ion etching, sawing, cutting, scoring and tearing, freezing and fracturing, direct additive manufacturing methods such as fused deposition modeling, stereolithography, selective laser sintering, 3D printing, laminated object manufacturing or others.

In one embodiment, a method of making the actuator further includes arranging the first and second sheets to form a tube.

In some embodiments, the sheets can be further manipulated after stacking and before jamming or inserting into a sleeve. In some embodiments, the sheets can be extended or shifted to alter the misalignment of the patterns. In some embodiments, the sheets can be pre-deformed to ensure that buckling or rotation occurs in the desired direction. In some embodiments, the sheets can be interlocked or interleaved.

Although the terms, first, second, third, etc., can be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, can be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," can encompass both an orientation of above and below. The apparatus can be otherwise oriented (e.g., rotated 90 degrees or at other orientations) and the spatially relative descriptors used herein interpreted accordingly. Further still, in this disclosure, when an element is referred to as being "linked to," "on," "connected to," "coupled to," "in contact with," etc., another element, it can be directly linked to, on, connected to, coupled to, or in contact with the other element or intervening elements can be present unless otherwise specified.

The terminology used herein is for the purpose of describing particular embodiments and is not intended to be limiting of exemplary embodiments. In certain embodiments, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

EXAMPLES

Certain embodiments will now be described in the following non-limiting examples.

VII. Design

Kirigami springs have typically been used to convert inextensible thin-films of rigid material into springs by introducing openings that allow out-of-plane buckling to reduce stresses within the plane which greatly enhances the in-plane compliance. Kirigami springs have not been reported in geometrically constrained systems or as a portion of a composite that could change its stiffness and/or act as an actuator when needed. Jamming layer composites including stacks of sheets without openings are designed to change their bending stiffness, and these composites are not generally extensible because the individual sheets are stiff in tension. In certain embodiments, a very high ratio of stiff/soft modulus is achieved with jamming kirigami because of the geometric advantage that vacuum can apply to the spring elements. Additionally, the kirigami elements are easily stacked in parallel or perpendicular arrangements for higher isotropic or anisotropic strength and the kirigami internal spring can be made of a large variety of materials including thin metal sheets. The concept of the jammed kirigami springs is also very scalable to both large macroscale sheets and can also be reduced in size to the microscale. Constrained kirigami on the microscale can make use of alternative actuation mechanisms like electrostatic or magnetic forces to control the stiffness.

Kirigami sheets with parallel openings or cuts have highly non-linear performance that is based on the geometry or pattern of the openings. A critical loading point occurs at which the kirigami sheet shifts its deformation from in-plane bending to out-of-plane bending. If at least two layers 102, 104 of kirigami are stacked on top of one another so that the openings or cuts 103, 105 are not aligned, the structure, when jammed together, will prevent the free buckling of each layer and force the in-plane deformation to occur at much larger loads than the unrestrained critical buckling load. Additionally, if the kirigami has already been significantly loaded in its unrestrained form, some local plastic deformations will dramatically lower the initial stiffness still further, compared to the ideal case as described by others. The actual performance of the jammed actuator can be predicted to a first order by ignoring friction between the layers, and the influence of the membrane. At the most basic, the composite is a spring that switches between bending out-of-plane where it is thinnest to one where it is constrained in-plane. For parallel cut kirigami, the space between openings forms spring elements with widths equal to the spacing between openings and lengths equal to the length of the openings. In parallel cut kirigami where the length of the spring element is much longer than the width of the spring element (1>10 w), it has been reported that the individual spring elements can be modeled as rectangular beams, with thickness t, width w (equal to the spacing between beams), and length l. The total stiffness of a kirigami spring ($K_l$) made of 2N beams in series in its initial, stiff, configuration is:

$$K_1=k_1/(2N) \text{ and } k_1 \approx Ew^3t/l^3 \quad (1)$$

After a critical displacement, the kirigami spring buckles out-of-plane and the new softer stiffness is $K_2=k_2/(2N)$ where $k_2 \approx Et^3w/l^3$. If a single thickness kirigami spring were constrained in a perfectly frictionless sleeve that prevented all out-of-plane motion, it is clear that the ratio is:

$$K_1/K_2 \approx (w/t)^2 \gg 1 \quad (2)$$

For the composite actuators, the spring lengths were designed to be much shorter, such that 1<5 w and some deviation from this theory occurs because of the added influence of boundary conditions in each spring element and non-Euler beam theory being required. Additionally, the constraint conditions are non-ideal, so some out-of-plane bucking can occur at higher critical displacements, and friction between the sleeve and between kirigami springs would also have to be considered to get a full understanding of each composite's behavior. To demonstrate the proof-of-concept for the design mechanisms, this more in-depth analysis can be saved for future work but generally the ratio of stiffness switching can be improved by using very thin, long springs with large widths. Additionally, it is advantageous to make the composites with higher numbers of thinner springs. For example, if a single kirigami sheet was replaced with two half-thickness sheets in parallel and assuming no friction between them, the initial stiffnesses would be the same, i.e., $k_1'=k_1Ew^3t/l^3=2Ew^3t/2l^3$. Once buckling occurs, however, the values of $k_2$ would be different: $k_2'=2E(t/2)^3w/l^3=k_2/4$. Larger numbers of thinner sheets are in general better at switching stiffness, but the stiffness of the sleeve in parallel with the kirigami stack will provide a lower limit on how soft the composite can be.

VIII. Pneumatic Actuation

Kirigami springs were cut from 5" wide polyester shims from McMaster-Carr, previously used by others for integration of kirigami with soft robotics. Kirigami springs were produced with a variety of cut dimensions and shapes to enable experimentation with different shim thickness and assembly techniques. A schematic of a basic kirigami spring design and the resulting performance of a representative composite tested in this work is shown in FIG. 1D and FIG. 4. A reversibly sealed Ecoflex 00-30 sleeve 106 that was much larger than the springs was initially used to qualitatively determine best spring strategies, jamming mechanisms and effective stiffness under vacuum and at atmospheric conditions. No attempts are made to optimize the exact kirigami stiffness properties because the intent is to simply demonstrate how the concept works. When working with silicone sleeves, the kirigami springs were modified by first taping a layer of cleanroom wipe onto them with double sided tape. This bonded porous layer, along with a structured inner silicone surface, reduced adhesion between the kirigami and the sleeve and allowed vacuum to be more evenly distributed across the springs. Later tests employed thin latex sheets, which are commercially available in large quantities and very thin layers (~150 μm), or thin cast Dragonskin which was found to be more durable in very thin layers than the Ecoflex. The main benefit of using latex or Dragonskin is that when the surfaces are slightly rough, they would not reversibly bond to the polyester shims and this avoided the need for an added paper layer, simplifying the manufacturing process.

High-temperature silicone rubber tubing (semisoft 1/32" ID, 1/16" OD, semi-clear blue) to connect to the vacuum, high strength silicone adhesive (RTV 159) for the sleeve 106, and 0.005" thick polyester shims (part no. 9513K17) for the sheets, are purchased from McMaster-Carr. Sleeves for the kirigami can be manufactured from a variety of materials, including Ecoflex 00-30, Dragonskin 10, and thin latex sheets. Double sided adhesive (Flexmount Select DF021621) and VWR® Spec-Wipe® 3 Wipers (21914-758) is appliedto bond a porous, high friction layer to some polyester shims before laser cutting when using Ecoflex silicone pouches to minimize sticking and friction between the shims and the interior of the pouch. Stiffer silicones and latex can work without the use of bonded paper if the interior surface of the pouch is rough. Polyester shims were cut on a $CO_2$ laser cutter in the desired opening patterns. The total power for cutting depends on the stack thickness but is set to between 8 and 14% power for these springs, with 20% speed and 1000 PPI as constant for all thicknesses.

Silicone pouches were manufactured by mixing up the silicone in a 1:1 ratio, degassing the silicone mixture, then casting the mixture on top of a roughened ABS surface. The roughness reduced inherent adhesion and friction between the silicone pouch and the kirigami springs and made the full system easier to assemble. Strips are cut from this cast sheet to be slightly larger than the kirigami, then the kirigami is bonded between the two sheets with Silpoxy adhesive (Smooth-On). The perimeter of the sleeve is sealed with more silicone (Ecoflex or Dragonskin) and once cured is trimmed to the desired size. A silicone tube for connection with a vacuum is inserted into the pouch with a cannula, and the puncture is sealed with more Silpoxy.

IX. Elongation

Figure 13A:
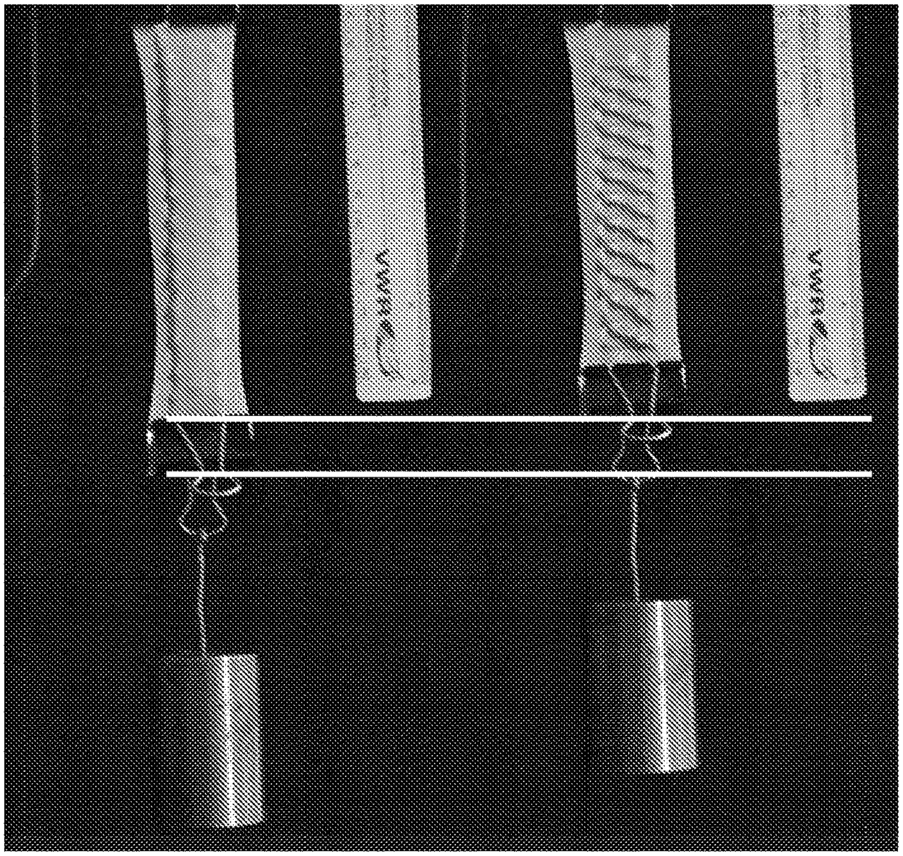
FIGS. 13A-13B demonstrate a change in elongation between a first, unjammed state and second, jammed state, according to some embodiments.
Figure 13B:
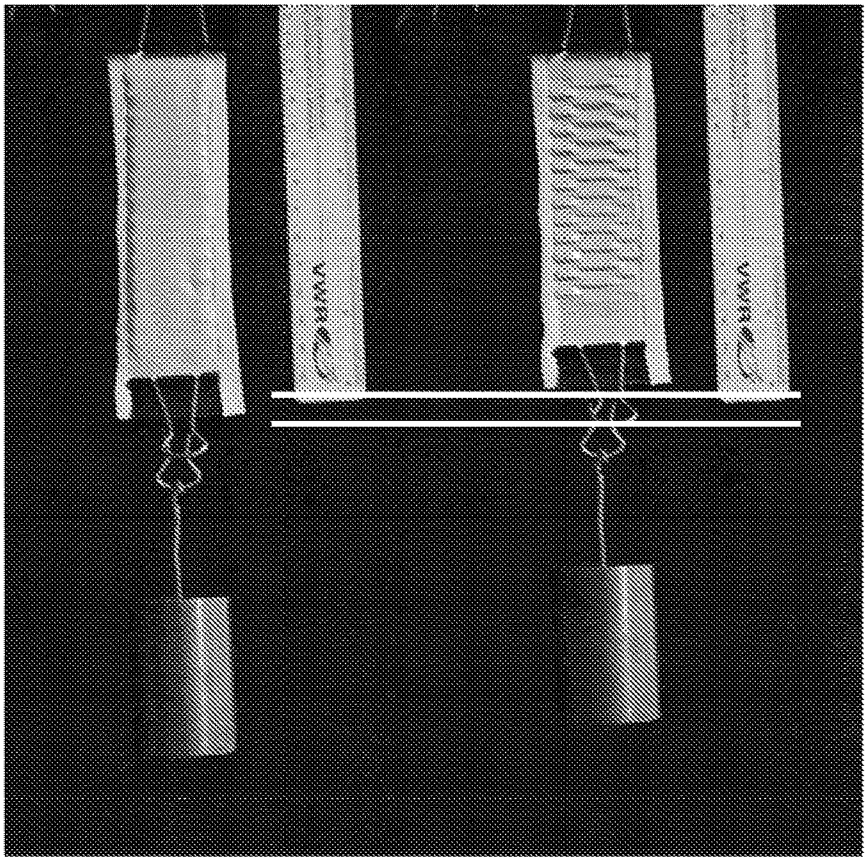

Elongation of the jammable kirigami composite occurs with an increase in volume of the sleeve as well. Depending on the width, number and design of the spring elements, this elongation can be a few percent or several hundred percent when no vacuum is applied. To elongate freely, friction must be minimized between the springs and the silicone pouch and the volume must be allowed to increase due to the rotation out-of-plane of the spring elements. For these tests, the limitation on how fast the actuator can soften is limited by the airflow into the pouch, but normally can occur on the order of a second. It is intended for these composites that the default state will be stiff and then can be made selectively soft if required. The advantage is that only a single pressure source is needed for actuation, and very little airflow is required to switch the composite. An actuator can operate in one mode indefinitely and be mechanically reprogrammed by turning the jamming on and off FIGS. 13A-13B show how geometry impacts actuation of an elongating spring. Each actuator is lifting a 500 g load from an unjammed, first state (left) to a second, jammed state (right) when a vacuum is applied. The narrow actuator (FIG. 13A) elongates more than the wide actuator (FIG. 13B) in the first state, but the narrow actuator actuates faster and has a larger lift displacement (18 mm vs. 12 mm).

X. Shape Memory Properties

Figures 14A, 14B, 14C, 14D, 14E:
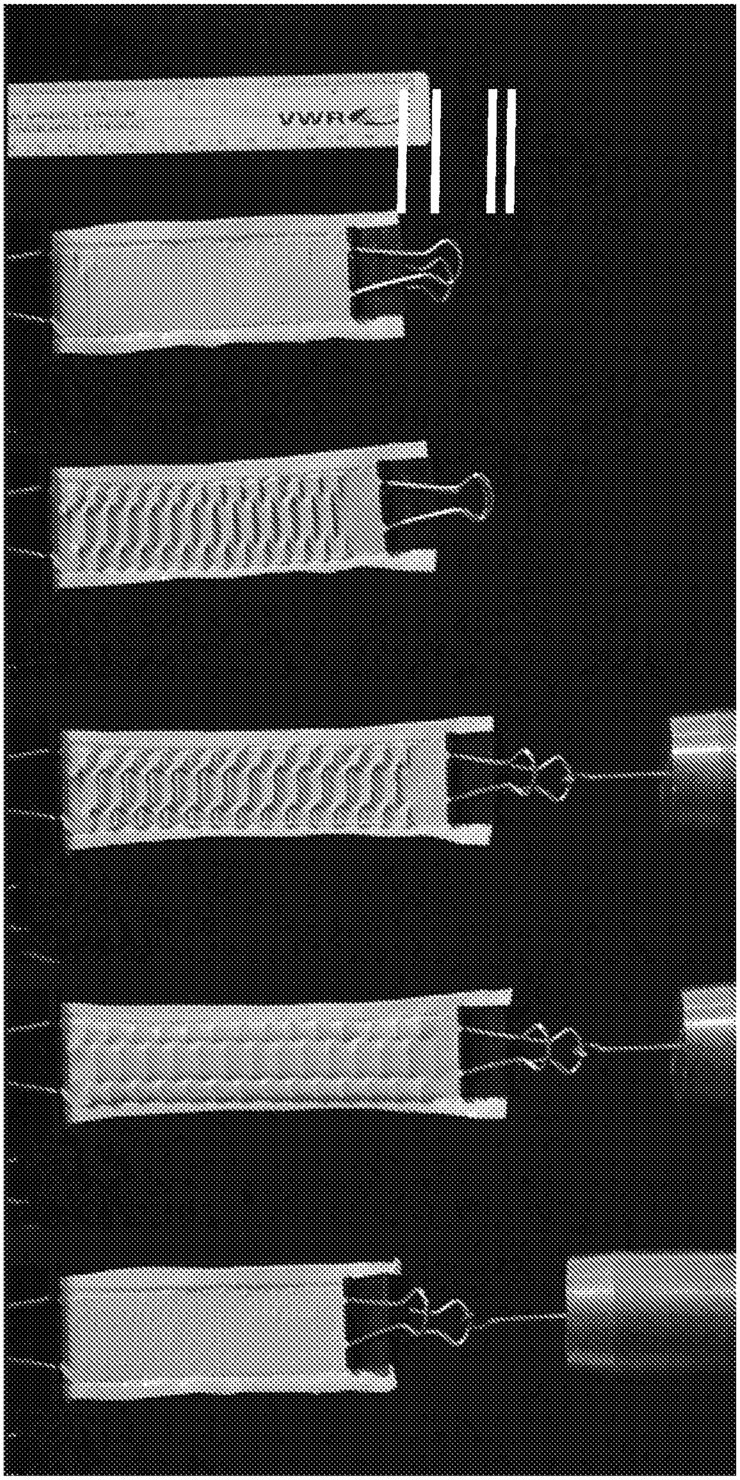
FIGS. 14A-14E show a sequence demonstrating the shape-memory effect of the actuator, according to some embodiments.

FIGS. 14A-14E show shape memory properties of a kirigami spring holding 1 kg of load. First, in FIG. 14A, the kirigami spring is holding 1 kg of load while the vacuum is applied and the kirigami spring is jammed. Next, in FIG. 14B the kirigami spring expands dramatically when the vacuum is released and the kirigami spring is unjammed. In FIG. 14C, when the vacuum is reapplied while this system is extended, the composite isn't capable of fully lifting the mass, but rather a morphology change and temporary elongation occurs for the composite, even after the load is removed, as in FIG. 14D. Once unjammed and rejammed, as in FIG. 14E, the composite returns to its neutral position, showing the effective performance of shape memory material. This performance of surface morphology changes and shape memory effects in jamming materials with simple elongation is unique to these kirigami composites. Effectively the composite can act in a plastic manner, while maintaining local stress within the materials below elastic limits. Additionally, this mode can be enhanced if the kirigami relative positions of the kirigami sheets are shifted within the sleeve. If the cuts are aligned, the kirigami cannot restrict out-of-plane displacement and acts as a double thickness spring in parallel with the elastomer sleeve. The repositioning of kirigami cuts within the composite after manufacturing provides a novel means of tuning device performance, although precise positioning to ensure misalignment of the openings is crucial for consistent results.

In some embodiments, the shape memory effect is achieved using a two-dimensional actuator. An actuator according to this embodiment of the invention is described with respect to FIGS. 12A-12E. In this embodiment, a three-dimensional deformation is applied to a two-dimensional actuator while in the first state, as shown in FIG. 12A. The actuator is then actuated from the first state to the second state and maintained in the second state to maintain the deformation, as shown in FIGS. 12C and 12D. The actuator is then returned to the first state to remove the deformation, as shown in FIG. 12E. This method provides a mechanism for reversibly changing the shape of the actuator.

XI. Magnetic Actuation

As shown in FIG2. 2A-2D, as a proof-of-principle to show how the kirigami can be stiffness switched with alternative mechanisms, we procured a first flexible magnetic strip 202 and a second flexible magnetic strip 204 and manually cut the strips using razor blades and hole punches to achieve a basic kirigami spring design. Tests with free weights loaded at the end of the magnetic kirigami clearly show that the maximum load with the anti-aligned cuts (FIG. 2C) is much higher than with aligned cuts. Both aligned and misaligned cuts with the magnetic surfaces facing each other are higher than the kirigami where the magnetic fields are directed away from each other (FIG. 2B). This demonstrates the feasibility of using the jamming kirigami with alternative actuation mechanisms, and future efforts to use electrostatic attraction between layers could be exceptionally scalable to micron or sub-micron sizes. As shown in FIG. 2D, the stiffness of the actuator with misaligned sheets is greater than the stiffness of the actuator with aligned sheets.

XII. Soft Robots

The pressurized network actuators can be programmed to change shape and mechanical properties using an external stimulus (in this instance, pressure). The soft robot structures utilize designs of embedded pneumatic or hydraulic networks of channels in elastomers that inflate like balloons for actuation. A series of parallel chambers embedded within an elastomer can be used as a series of repeating components. Stacking and connecting these repeated components provide structures capable of complex motion. In this type of design, complex motion requires only a single pressure source; the appropriate distribution, configuration, and size of the pressurized networks, in combination with a sequence of actuation of specific network elements, determine the resulting movement. According to one or more embodiments, the soft robotic devices operate without use of rigid weight bearing skeletons. Soft robots have embedded channels or networks of channels. These embedded channels can be pressurized to provide large and versatile actuation to soft elastomers. A channel is embedded in a soft rubber (elastomeric) form having a stiffer, yet still pliable backing layer. A high elastic modulus is sought for materials used for sections of the network where inflation is undesirable, while a low elastic modulus is used for materials of the network where extensibility is needed. Upon pressurization of the channels via air (pneumatic) or fluid (hydraulic), the soft-elastomer network expands. The soft rubber's expansion is accommodated by bending around the stiffer, strain limiting layer. In this embodiment, the differential expansion leads to asymmetric elongation and bending of the soft robot actuator.

Figure 15A:
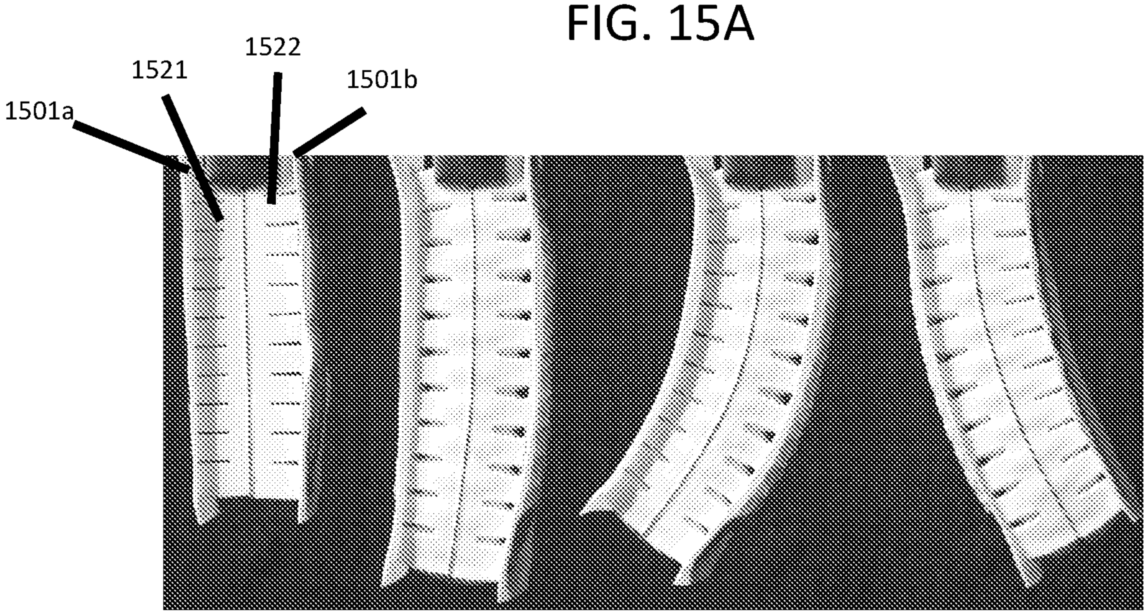
Figure 15A:
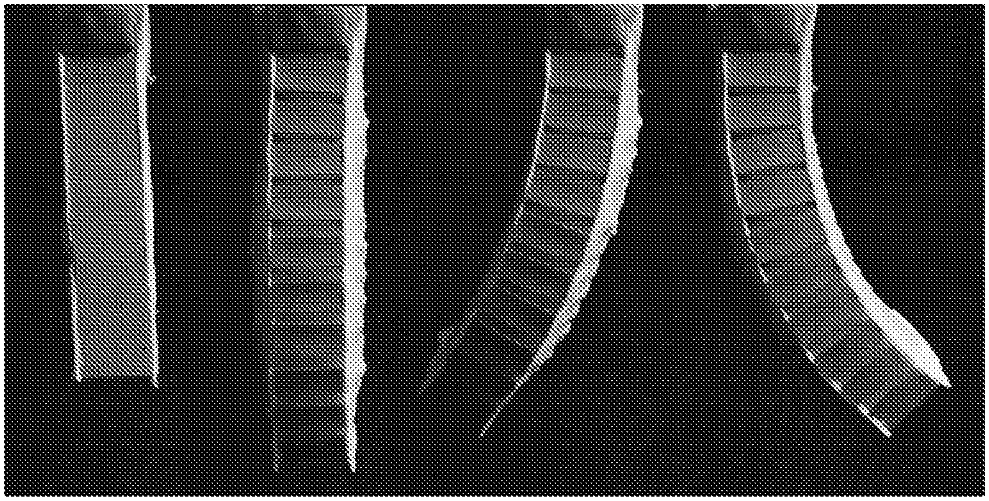

As shown in FIGS. 15A-15B, a first pneunet 1521 and a second pneunet 1522 were cast from Dragonskin 30 and aligned and sealed to each other with RTV 159 silicone adhesive. After testing for leak free operation, a first jamming kirigami actuator 1501*a* was bonded to one side of the pneunet and a second jamming kirigami actuator 1501*b* was bonded to the opposite side of the pneunet with Silpoxy to demonstrate the integration of a switchable strain limiting layer. For these tests the kirigami was scaled to be equal to the pneunet width (~20 mm). FIG. 15A and 15B show examples of how a jammable kirigami composite can be integrated into a soft robot. As shown in FIG. 15A, the kirigami composite sleeve is bonded in discrete locations that have minimal dimension change across the bonded area, but are separated during actuation by the overall expansion of the actuator. As shown in FIG. 15B, the kirigami composite sleeve is bonded continuously along the length of the expanding silicone actuator. The linear pneunets are shown operating in extension, and positive or negative curvature bending modes as an example application for reprogrammable soft actuators. When the first kirigami sleeve 1501*a* is jammed, the first kirigami sleeve acts as the strain-limiting layer, and the pneunet is deflected in the direction of the first kirigami sleeve when pressurized. When the second kirigami actuator 1501*b* is jammed, the second kirigami sleeve acts as the strain-limiting layer, and the pneunet is deflected in the direction of the second kirigami sleeve when pressurized. While other soft robots have used multiple pressure sources to control the curvature of a single actuator in 3D space, this is the first to have a stiffness changing jamming composite, that is still highly flexible in bending, integrated into the robot design.

XIII. Self-Jamming Actuators

In one embodiment, a first sheet 502 and second sheet 504 have a bidirectional opening pattern as shown in FIG. 5A. Each sheet has a two-dimensional, periodic array of alternating square first regions of openings parallel to a first axis and second regions of openings parallel to a second axis. The first axis and second axis are perpendicular. The two-dimensional, periodic array is such that openings of each region are perpendicular to the openings of the adjacent region. When the actuator is assembled, the openings are misaligned. For example, the openings can be misaligned such that each region of openings of the first sheet 501 overlaps with a region with perpendicular openings of the second sheet 502. FIG. 5B shows a force applied to the two bidirectional sheets, while FIG. 5C shows two stacked, bidirectional sheets. If a region has openings that are parallel to the axis of the applied force, that region acts as a stiff region 513 having stiffness $k_{stiff}$. If a region has openings that are perpendicular to the axis of the applied force, that region acts as a soft region 514 having stiffness $k_{soft}$.

Figure 5D:
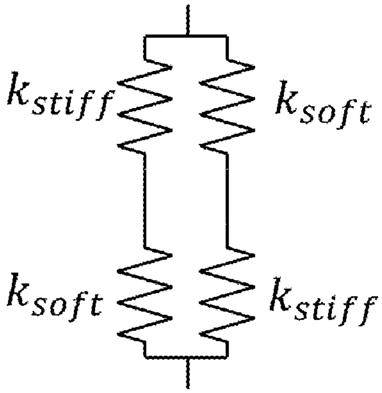
Figure 5E:
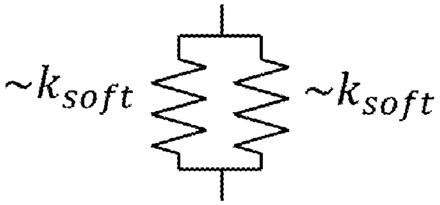
Figure 5F:
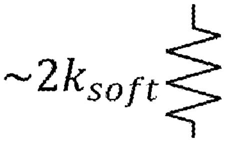
Figure 5G:
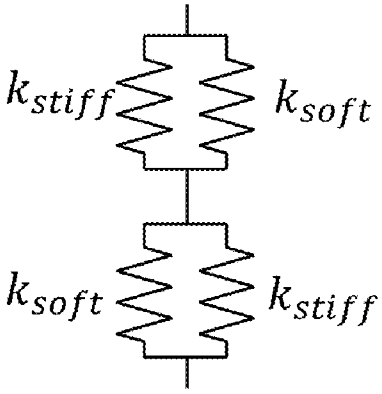
Figure 5H:
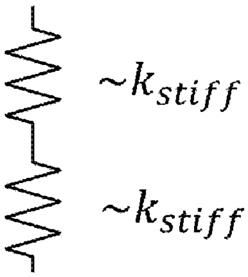
Figure 5I:
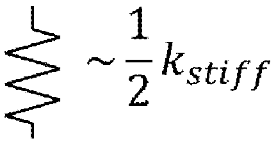

FIGS. 5D-5I provide a model for the bidirectional actuator in the unjammed and jammed states. In the unjammed state, each sheet individually can be modeled as a soft spring and a stiff spring in series. When stacked together and unjammed, the stiffness of the two sheets can be modeled in parallel, as shown in FIG. 5D. Since $k_{stiff}$ is much stiffer than $k_{soft}$, the model can be simplified to two soft springs in parallel, as shown in FIG. 5E, and further simplified to a single spring with twice the stiffness of the soft spring, as shown in FIG. 5F. In the unjammed state stiffness is dominated by the soft regions. In the jammed state, the stiff regions of the first sheet and the stiff regions of the second sheet push against each other, acting as two springs in parallel. Similarly, in the jammed state, the soft regions of the first sheet and the soft regions of the second sheet push against each other, acting as two springs in parallel. As showed in FIG. 5G, this jammed state can be modeled as two sets of parallel soft and stiff springs in series with each other. Since $k_{stiff}$ is much stiffer than $k_{soft}$, the model can be simplified to two stiff springs in series, as shown in FIG. 5H, and further simplified to a single spring with half the stiffness of the stiff spring, as shown in FIG. 5I In the jammed state stiffness is dominated by the stiff regions.

XIV. Mechanical Testing of Actuators

An Instron 5566 was used to get load-displacement curves of kirigami springs in isolation, as well as those that are contained within sleeves with and without jamming. The load cell has a maximum load of 10 N and a sensitivity of 0.1%. The tension test was run at 10 mm/minute and the trial ends at a displacement of 10 mm or a load of 10 N or 20 N depending on spring design. Each test is run 7 times.

It will be appreciated that while one or more particular materials or steps have been shown and described for purposes of explanation, the materials or steps can be varied in certain respects, or materials or steps can be combined, while still obtaining the desired outcome. Additionally, modifications to the disclosed embodiment and the invention as claimed are possible and within the scope of this disclosed invention.

The invention claimed is:

1. An actuator comprising:

a first sheet comprising a plurality of first openings and a plurality of first beams, each of the plurality of first beams being positioned between two of the plurality of first openings; and a second sheet comprising a plurality of second openings and a plurality of second beams, each of the plurality of second beams being positioned between two of the plurality of second openings;

wherein the first and second sheets are stacked together such that at least one of the first and second openings are misaligned;

upon an actuation, the actuator changes from a first state to a second state, wherein in the first state, the first beams are positioned at a first angle relative to the second beams, and in the second state, the first beams are rotated with respect to the second beams such that the first beams are positioned at a second angle relative to the second beams, the first angle being substantially different from the second angle; and wherein in the first state, out-of-plane motion of the first and second sheets is permitted; and in the second state, the first and second sheets as well as the misaligned first and second openings are jammed together to restrict the out-of-plane motion of the first and second sheets; and wherein in the second state, the first and second sheets are magnetically attractive to each other such that the first and second sheets are jammed together;

in the second state, the first and second sheets are electrically attractive to each other such that the first and second sheets are jammed together;

in the second state, the first and second sheets are adhered together by an adhesive disposed on the surfaces of each of the first and second sheets facing each other such that the first and second sheets are jammed together; or the first and second sheets are enclosed within a sleeve, and in the second state, the first and second sheets are jammed together by an external pressure applied to the exterior of the sleeve such that the first and second sheets are jammed together.

2. The actuator of claim 1, wherein the stiffness of the actuator in the second state is at least 5-100 times of the stiffness of the actuator in the first state.

3. The actuator of claim 1, wherein at least one of the first and second sheets comprise a material selected from the group consisting of metals, ceramics, polymers, elastomers, paper, woven textiles, nonwoven textiles, magnetic materials, graphene and combinations thereof.

4. The actuator of claim 1, wherein the first and second sheets have different thicknesses.

5. The actuator of claim 1, wherein at least one of the first and second sheets has a nonuniform thickness.

6. The actuator of claim 1, further comprising a porous, extensible sheet disposed between the first and second sheets.

7. The actuator of claim 1, wherein in the second state, the first and second sheets are magnetically attractive to each other such that the first and second sheets are jammed together;

in the second state, the first and second sheets are electrically attractive to each other such that the first and second sheets are jammed together; or in the second state, the first and second sheets are adhered together by an adhesive disposed on the surfaces of each of the first and second sheets facing each other such that the first and second sheets are jammed together.

8. The actuator of claim 1, wherein in the second state, the first and second sheets are magnetically attractive to each other such that the first and second sheets are jammed together.

9. The actuator of claim 1, wherein in the second state the first and second sheets are electrically attractive to each other such that the first and second sheets are jammed together.

10. The actuator of claim 1, wherein in the second state, the first and second sheets are adhered together by an adhesive disposed on the surfaces on the surfaces of each of the first and second sheets facing each other such that the first and second sheets are jammed together.

11. The actuator of claim 1, wherein the first sheet further comprises a plurality of third openings; and the second sheet further comprises a plurality of fourth openings;

wherein the first and second sheets are stacked together such that at least one of the third and fourth openings are misaligned; and the actuator is configured such that the misaligned third and fourth openings are capable of being jammed together independent of the misaligned first and second openings.

12. The actuator of claim 1, wherein the lengths of the first openings are at least three times greater than the widths of the first opening; and the lengths of the second openings are at least three times greater than the widths of the second openings.

13. The actuator of claim 12, wherein the first openings are arranged to form a first pattern and the second openings are arranged to form a second pattern.

14. The actuator of claim 13, wherein at least one of the first and second patterns comprise openings oriented randomly with respect to each other, openings oriented parallel to each other, or openings at angles to each other.

15. The actuator of claim 12, wherein at least one of the first and second openings comprise curved openings.

16. The actuator of claim 12, wherein at least one of the first openings is configured to interlock with at least one of the second openings.

17. The actuator of claim 12, further comprising a first plurality of scorings oriented perpendicular to the first openings and a second plurality of scorings oriented perpendicular to the second openings.

18. The actuator of claim 13, wherein the first and second patterns are periodic.

19. The actuator of claim 13, wherein the first and second openings are misaligned by an offset pitch.

20. The actuator of claim 13, wherein at least one of the first and second patterns comprise a two-dimensional, periodic array of alternating first regions of openings parallel to a first axis and second regions of openings parallel to a second axis, wherein the second axis is perpendicular to the first axis.

21. The actuator of claim 1, wherein the actuator has a negative or zero Poisson's ratio in the plane of the actuator.

22. The actuator of claim 1, wherein the first and second sheets are arranged in a tube shape.

23. The actuator of claim 22, further comprising a balloon disposed within the tube.

24. A method for actuation comprising:

providing the actuator of claim 1;

actuating the actuator from the first state to the second state.

* * * * *